(12) United States Patent
Schaaf et al.

(10) Patent No.: US 9,676,160 B2
(45) Date of Patent: Jun. 13, 2017

(54) HOLDING SYSTEM FOR ELONGATE MEMBERS

(71) Applicant: The Boeing Company, Chicago, IL (US)

(72) Inventors: America O. Schaaf, Seattle, WA (US); Richard A. Miller, Auburn, WA (US)

(73) Assignee: THE BOEING COMPANY, Chicago, IL (US)

(*) Notice: Subject to any disclaimer, the term of this patent is extended or adjusted under 35 U.S.C. 154(b) by 319 days.

(21) Appl. No.: 14/225,939

(22) Filed: Mar. 26, 2014

(65) Prior Publication Data

US 2014/0202611 A1 Jul. 24, 2014

Related U.S. Application Data

(63) Continuation-in-part of application No. 13/690,809, filed on Nov. 30, 2012, now Pat. No. 9,067,374.

(51) Int. Cl.
| | |
|---|---|
| *B29C 63/02* | (2006.01) |
| *B29C 63/30* | (2006.01) |
| *B29C 65/02* | (2006.01) |
| *B29C 65/48* | (2006.01) |
| *B29D 99/00* | (2010.01) |
| *B29C 65/00* | (2006.01) |
| *B29L 31/00* | (2006.01) |

(52) U.S. Cl.
CPC .......... *B29D 99/001* (2013.01); *B29C 63/024* (2013.01); *B29C 65/02* (2013.01); *B29C 66/80* (2013.01); *B29L 2031/001* (2013.01); *Y10T 156/10* (2015.01); *Y10T 156/1052* (2015.01); *Y10T 156/1348* (2015.01); *Y10T 156/17* (2015.01); *Y10T 156/1788* (2015.01)

(58) Field of Classification Search
CPC . B29L 2031/003; B29C 63/024; B29C 65/02; B29C 65/014; B29C 66/80; B29C 2793/00; B29C 2793/0027; B29C 2793/0063; B29C 65/4815; B29C 65/481; B29C 65/4805; B29C 65/48; B29C 65/486; Y10T 156/1052; Y10T 156/1348; Y10T 156/1788
USPC ......................................... 156/523
See application file for complete search history.

(56) References Cited

U.S. PATENT DOCUMENTS 3,107,376 A * 10/1963 Reid .................... A43D 11/006
 12/1 R
3,522,132 A 7/1970 Cardis
(Continued)

FOREIGN PATENT DOCUMENTS

| DE | 1924971 A1 | 9/1970 |
|---|---|---|
| EP | 0167377 A2 | 1/1986 |

(Continued)

OTHER PUBLICATIONS

Office Action dated Dec. 17, 2015 regarding U.S. Appl. No. 14/609,487, 16 pages.

(Continued)

*Primary Examiner* — Linda L Gray
(74) *Attorney, Agent, or Firm* — Yee & Associates, P.C.

(57) ABSTRACT

A holding system holds an elongate member in a desired position as a process operation is carried out on the member. The elongate member is held in a weight neutral position in a holding fixture without the need for clamps.

13 Claims, 31 Drawing Sheets

(56) References Cited

U.S. PATENT DOCUMENTS

| | | |
|---|---|---|
| 4,475,976 A | 10/1984 | Mittelstadt et al. |
| 4,699,683 A | 10/1987 | McCowin |
| 4,851,076 A | 7/1989 | Manusch et al. |
| 4,877,471 A | 10/1989 | McCowin et al. |
| 5,049,229 A | 9/1991 | Czech |
| 5,310,445 A | 5/1994 | Tucker |
| 5,346,580 A | 9/1994 | Elges et al. |
| 5,700,347 A | 12/1997 | McCowin |
| 6,096,164 A | 8/2000 | Benson et al. |
| 6,764,754 B1 | 7/2004 | Hunter et al. |
| 6,986,827 B2 | 1/2006 | Matsui et al. |
| 7,117,915 B2 | 10/2006 | Rolion |
| 7,213,629 B2 | 5/2007 | Ledet et al. |
| 7,419,031 B2 | 9/2008 | Liguore et al. |
| 7,681,615 B2 | 3/2010 | McCowin |
| 7,686,915 B1 | 3/2010 | McAnally |
| 7,766,063 B2 | 8/2010 | Lauder et al. |
| 8,156,988 B2 | 4/2012 | Martinez |
| 9,067,374 B2 | 6/2015 | Schaaf et al. |
| 2005/0092425 A1 | 5/2005 | Abe et al. |
| 2005/0194210 A1 | 9/2005 | Panossian |
| 2006/0118244 A1 | 6/2006 | Zaballos et al. |
| 2006/0260751 A1 | 11/2006 | Lauder et al. |
| 2007/0029030 A1 | 2/2007 | McCowin |
| 2007/0069080 A1 | 3/2007 | Rassaian et al. |
| 2007/0102239 A1 | 5/2007 | Liguore et al. |
| 2008/0277057 A1 | 11/2008 | Montgomery et al. |
| 2008/0282863 A1 | 11/2008 | McCowin |
| 2008/0302915 A1 | 12/2008 | Yip et al. |
| 2010/0012268 A1 | 1/2010 | Nobis et al. |
| 2010/0084087 A1 | 4/2010 | McCowin et al. |
| 2013/0032287 A1 | 2/2013 | Hagman et al. |
| 2014/0150964 A1 | 6/2014 | Schaaf et al. |
| 2014/0290822 A1 | 10/2014 | Schaaf et al. |
| 2015/0136328 A1 | 5/2015 | Schaaf et al. |

FOREIGN PATENT DOCUMENTS

| | | |
|---|---|---|
| WO | 9922932 A1 | 5/1999 |
| WO | 02070232 A1 | 9/2002 |

OTHER PUBLICATIONS

International Preliminary Report on Patentability, dated Jun. 2, 2014, regarding Application No. PCT/US2013/062528, 9 pages.

Office action dated Oct. 1, 2014 regarding U.S. Appl. No. 13/690,809 , 19 pages.

Notice of Allowance dated Dec. 4, 2014 regarding U.S. Appl. No. 13/690,809 , 7 pages.

PCT Search Report, dated Jan. 3, 2014, regarding Application No. PCT/US2013/062528, 6 pages.

Notice of Allowance dated Feb. 18, 2016, regarding U.S. Appl. No. 14/609,487, 5 pages.

PCT Search Report, dated Dec. 13, 2005, regarding Application No. PCT/ES2005/000408, 2 pages.

Schaaf et al., "Method and Apparatus for Applying Film Material to Elongate Members," U.S. Appl. No. 13/690,809, filed Nov. 30, 2012, 53 pages.

* cited by examiner

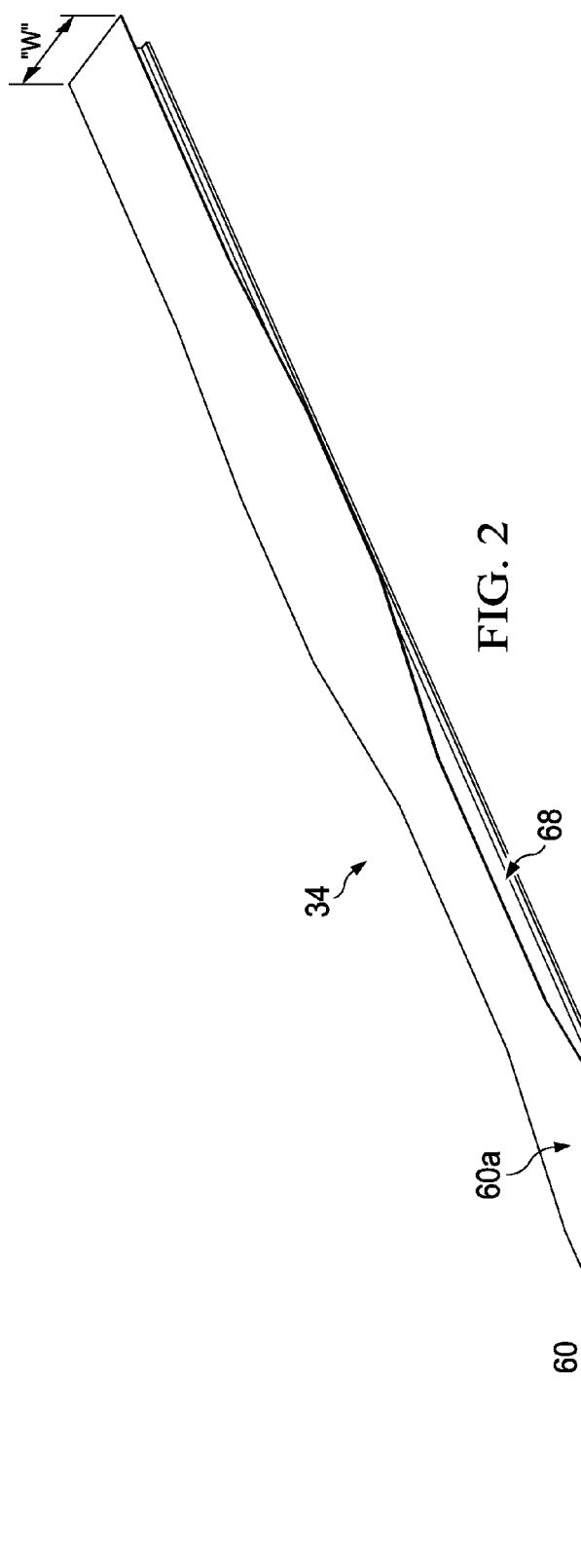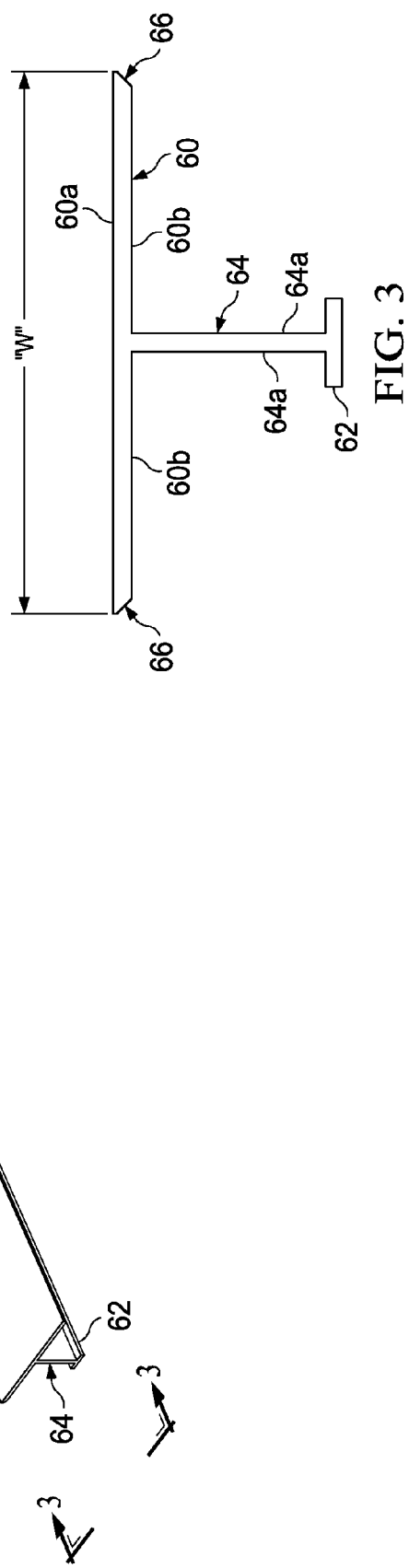

HOLDING SYSTEM FOR ELONGATE MEMBERS

CROSS REFERENCE TO RELATED APPLICATIONS

This application is a continuation-in-part of U.S. patent application Ser. No. 13/690,809 filed Nov. 30, 2012, the entire disclosure of which is incorporated by reference herein.

BACKGROUND INFORMATION

1. Field

The present disclosure generally relates to techniques and fixtures for holding a part or an elongate member such as a stringer during processing, and more particularly relates to a method and apparatus for holding and constraining the part in a desired position while reducing the need for clamps and manual labor.

2. Background

It is often necessary to hold parts in a desired position or orientation as the parts are being processed. For example, in the aircraft industry, long structural members such as composite stringers must be hand held in a desired position during an adhesive bonding process where a film material is attached to the stringer prior to covering with the skin of the aircraft. In preparation for bonding, the film adhesive material is manually rolled out to the length of the stringer, which may be 90 feet or more, and a protective poly backer must then be removed from the film. The entire length of the film material is then flipped over by a team of workers in order to place the backside of the film adhesive on a base flange of the stringer where it adheres. Workers then manually trim excess film material away from the edges of the base flange. Manual manipulation of the stringer may be tedious, time-consuming, labor intensive and presents the risk of damage to edges of the base flange of the stringer.

Accordingly, there is a need for a system for holding elongate members such as stringers which reduces the need for manual labor and allows adhesive processing operations to be performed more efficiently, reduce undesirable results associated with hand work and increase process flow time. There is also a need for a holding system that may be used in combination with a material applicator to quickly and consistently apply adhesive film material on elongate members such as stringers, and to trim excess film material thereafter.

SUMMARY

The disclosed embodiments provide an apparatus for applying material such as an adhesive film to an elongate member such as a stringer, as one or more processes are performed on the member. The apparatus substantially reduces the need for manual labor and improves process flow times.

The disclosed embodiments also provide a holding system for holding an elongate member, such as a Stringer as one or more processes are performed on the elongate member. More particularly, the holding system may be used in combination with a disclosed material applicator to apply adhesive films to a elongate members. The holding system substantially reduces the need for manual labor and improves process flow times. The holding system includes a modular holding fixture that may be adapted for use in holding elongate members of differing lengths. The holding fixture may include linear actuators that adjust the vertical position of the stringer such that it is weight neutral. The holding system reduces or eliminates the need for fixture type clamps, is adjustable, relatively simple, reliable and easy-to-use.

According to one disclosed embodiment, apparatus is provided for applying material to an elongate member. The apparatus comprises a base, a pair of spaced apart beams, and a material applicator movable along the beams for applying material to the elongate member. The apparatus further includes an elongate member support mounted on the base and disposed between the beams. The elongate member support includes an elongate member support surface adapted to support the elongate member beneath the material applicator as the material applicator moves along the beams and applies material to the elongate member. The elongate member support includes a plurality of support struts spaced along the length of the elongate member support for supporting the elongate member above the base at a desired elevation relative to the material applicator. The support struts include linearly displaceable rods capable of adjusting the elevation of the elongate member support surface. The linearly displaceable rods are coupled with actuators for displacing the linearly displaceable rods. The beams include flanges defining elongate tracks extending along the beams, and the material applicator is mounted on the elongate tracks. The material applicator includes rollers coupling the material applicator for linear rolling movement along the elongate tracks. The elongate tracks are spaced above the elongate member support surface. The material applicator includes pinch rollers capable of holding the elongate member in a substantially weight neutral condition on the elongate member support surface area. The material applicator may include a heater for heating a surface of the elongate member. The apparatus may further comprise a table upon which the base is removably mounted. The elongate member may comprise an aircraft stringer. In one variation, the combination of the base, the elongate member support and the beams are formed in modules allowing the length of the apparatus to be adjusted to suit elongate members having differing lengths.

According to another embodiment, a method is provided of applying a film material on a surface of an elongate member. The method comprises placing the elongate member in a mixture containing a channel, and moving a film applicator over the fixture. The method also includes using the film applicator to apply the film on the surface of the elongate member as the applicator moves over the fixture. The method may further comprise supporting the elongate member such that the surface of the elongate member is spaced a desired distance beneath the film applicator and is in a weight neutral position. The method also includes using the film applicator to constrain the elongate member against movement as the film applicator moves over the fixture.

According to another disclosed embodiment, a holding system is provided for holding an elongate member for processing, comprising a pair of laterally spaced beams defining a channel therebetween, and an elongate support mounted within the channel. The support is adapted to have the elongate member placed thereon, and functions to support the member along its length. The apparatus further comprises actuators for adjusting the position of the elongate support within the channel. The actuators include actuator rods extending into and linearly displaceable within the channel. The apparatus may further comprise a carriage supported on and movable along the beams. The carriage includes wheels engaging the beam and capable of allowing the carriage to move linearly along the beams. Each of the beams includes a flange defining a track, and the wheels are mounted on the tracks.

According to still another embodiment, a method is provided of holding an elongate part in a weight neutral position as an applicator moves along the length of and applies material to the elongate member. The method comprises placing an elongate member support within a channel, and placing an elongate member on the elongate member support. The method further comprises using the elongate member support to support the elongate p member within the channel beneath the applicator, and using the applicator to constrain the elongate member against movement as the applicator moves along the length of the elongate member. Using the applicator to constrain the elongate member against movement includes moving actuators into engagement with the elongate member. Moving the actuators into engagement includes pinching the elongate member between at least one set of rollers. Placing the elongate member support within a channel includes mounting the elongate member support on a base between a pair of spaced apart beams. The method may further comprise using a plurality of actuators to adjust the vertical position of the elongate member support. Placing the elongate member support within the channel includes mounting a plurality of struts in spaced apart relationship on a base, and securing an elongate member [support surface on the struts. The method may also comprise using a plurality of actuators to adjust the vertical position of the elongate member support surface. The method may also comprise forming flanges on the beams, and supporting the applicator on the flanges spaced a desired distance above the elongate member.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and advantages thereof, will best be understood by reference to the following detailed description of an illustrative embodiment of the present disclosure when read in conjunction with the accompanying drawings, wherein:

FIG. 2 is an illustration of a perspective view of a stringer having a base flange surface to which film material is applied using the apparatus shown in FIG. 1.

FIG. 3 is an illustration of an end view of the stringer shown in FIG. 2.

DETAILED DESCRIPTION

Figure 1:
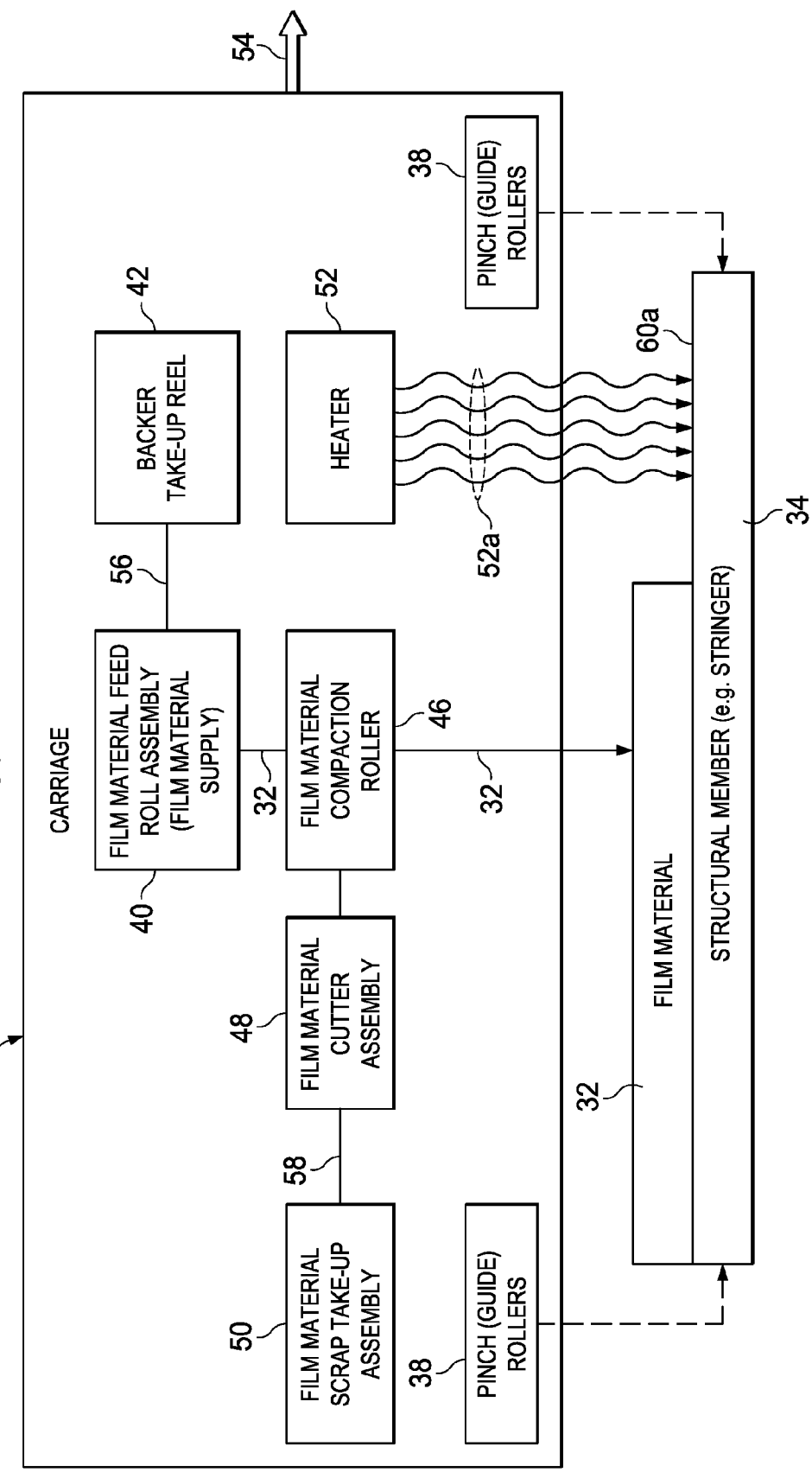
FIG. 1 is an illustration of a functional block diagram of an adhesive material applicator apparatus according to the disclosed embodiments.

Referring first to FIG. 1, the disclosed embodiments relate to an applicator apparatus 30 for dispensing, placing, compacting and trimming an adhesive film material 32, on the surface 60a of a part such as an elongate structural member 34. For simplicity of description the apparatus 30 will be hereinafter referred to as a film applicator 30, and the film material 32 may be referred to as film 32, material 32 or film material 32. The thickness of the adhesive film material 32 will depend upon the application. In the illustrated example discussed below in more detail, the elongate member 34 is a composite stringer, however it is to be understood that the film applicator 30 may be employed to apply film material 32 to the surface of any long, relatively narrow members such as, without limitation, spars, beams, doublers, etc. The film material 32 may comprise any relatively thin, flexible material that is required to be applied to the elongate member 34, such as without limitation, an adhesive backed film material.

The film applicator 30 comprises several functional components discussed below that are mounted on a carriage 36 for rolling movement along the structural member 34 by means of pinch rollers 38. The pinch rollers engage and grip the top, bottom and sides of the structural member 34 in order to both guide and index the film applicator 30 as the film applicator 30 is moved along the length of the elongate member 34 in the direction of travel or placement 54.

The film applicator 30 includes a film feed roll assembly 40 containing a supply of the film material 32 which is dispensed and fed to a film compaction roller 46. The film compaction roller 46 compacts the film material 32 against the surface 60a of elongate member 34 as the carriage 36 moves along the length of the elongate member 34. Optionally, a suitable heater 52 such as an infrared heater mounted on the carriage 36 may be used to heat 52a the surface 60a immediately before the film 32 is placed and compacted in order to improve adhesion of the film material 32 to the surface 60a. As the film 32 is being dispensed, a backer 56, typically a poly film material protectively covering the film material 32, is drawn away from the film material 32 and is fed to a backer take-up reel 42. A film cutter assembly 48 mounted on the carriage 36 aft of the film compaction roller 46 trims the outer edges of the film material 32 to substantially match the edges of the elongate member 34. The film scrap 58 resulting from this trimming operation is accumulated on a film scrap take-up assembly 50 which is also mounted on the carriage 36.

Referring now to FIGS. 2 and 3, the structural member 34 may comprise a composite laminate stringer 34, which is shown in an inverted position in the Figures. The stringer 34 includes a base flange 60 and a top flange 62 connected by a central web 64, forming a generally "T"-shaped cross-section (in the inverted position). The base flange 60 includes a flange surface 60a extending the entire length of the elongate member 34 and has a width "W". In the example shown in FIGS. 2 and 3, the width "W" is substantially constant along the entire length of the stringer 34, however in other examples the width "W" of the flange surface 60a may vary. Also, although the illustrated flange surface 60a of elongate member 34 in FIG. 2 is depicted as substantially flat and has an inward taper 68, in other examples, the flange surface 60a may be curved, and/or twisted along its length. Opposite longitudinal edges 66 of the base flange 60 may be beveled (FIG. 3). In order to bond the base flange 60 to another structure such as, for example and without limitation, an aircraft skin, a film adhesive is applied over the base flange surface 60a using the film applicator 30 shown in FIG. 1 and described in more detail below.

Attention is now directed to FIGS. 4-15 which illustrate one embodiment of the film applicator 30 which may be employed to place film material 32 on the flange surface 60a of an elongate member 34. In this example, the flange surface 60a includes an inward taper 68 (see FIGS. 2, 4 and 5) along its opposite beveled edges 66. As shown in FIGS. 9, 10, 13 and 14, the film applicator 30 includes a carriage 36 comprising a lower frame 84 and an upper frame 100 which are fixedly attached to each other by brackets 86. Handlebars 98 on opposite sides of the upper frame 100 are adapted to be grasped by a worker for handling and transporting the film applicator 30, and for manually moving it along the stringer 34 during the film application process. Outrigger wheels 92 attached to the outer ends of brackets 86 may be used to support and guide the film applicator 30 along a later discussed holding system 155 (FIGS. 25-29) that may be used to hold the stringer 34 in a fixed, inverted position during the film placement process.

A first set of longitudinally spaced pinch rollers 38a (FIGS. 6 and 7) mounted on the lower frame 84 of carriage 36 engage opposite sides 64a of the web 64 (see FIG. 3), thereby laterally indexing the carriage on the stringer 34. The pinch rollers 38a may be formed of any suitable material such as, without limitation, a synthetic rubber, and may be spring-loaded inwardly against the sides 64a of the web 64. A second set of longitudinally spaced pinch rollers 38b (see FIGS. 7, 10 and 13) similar in construction to pinch rollers 38a, are also mounted on the lower frame 84, and bear upwardly against lower base flange surfaces 60b (see FIG. 3) of the base flange 60 of elongate member 34. Pinch rollers 38b may be spring-loaded upwardly against the lower base flange surfaces 60b. Pinch rollers 38b, in combination with other components discussed below, vertically index the carriage 36 and grip the film applicator 30 onto the elongate member 34. The pinch rollers 38a, 38b effectively guide and allow the carriage to roll along surfaces 64a, 64b (FIG. 3) of the elongate member 34.

Figure 4:
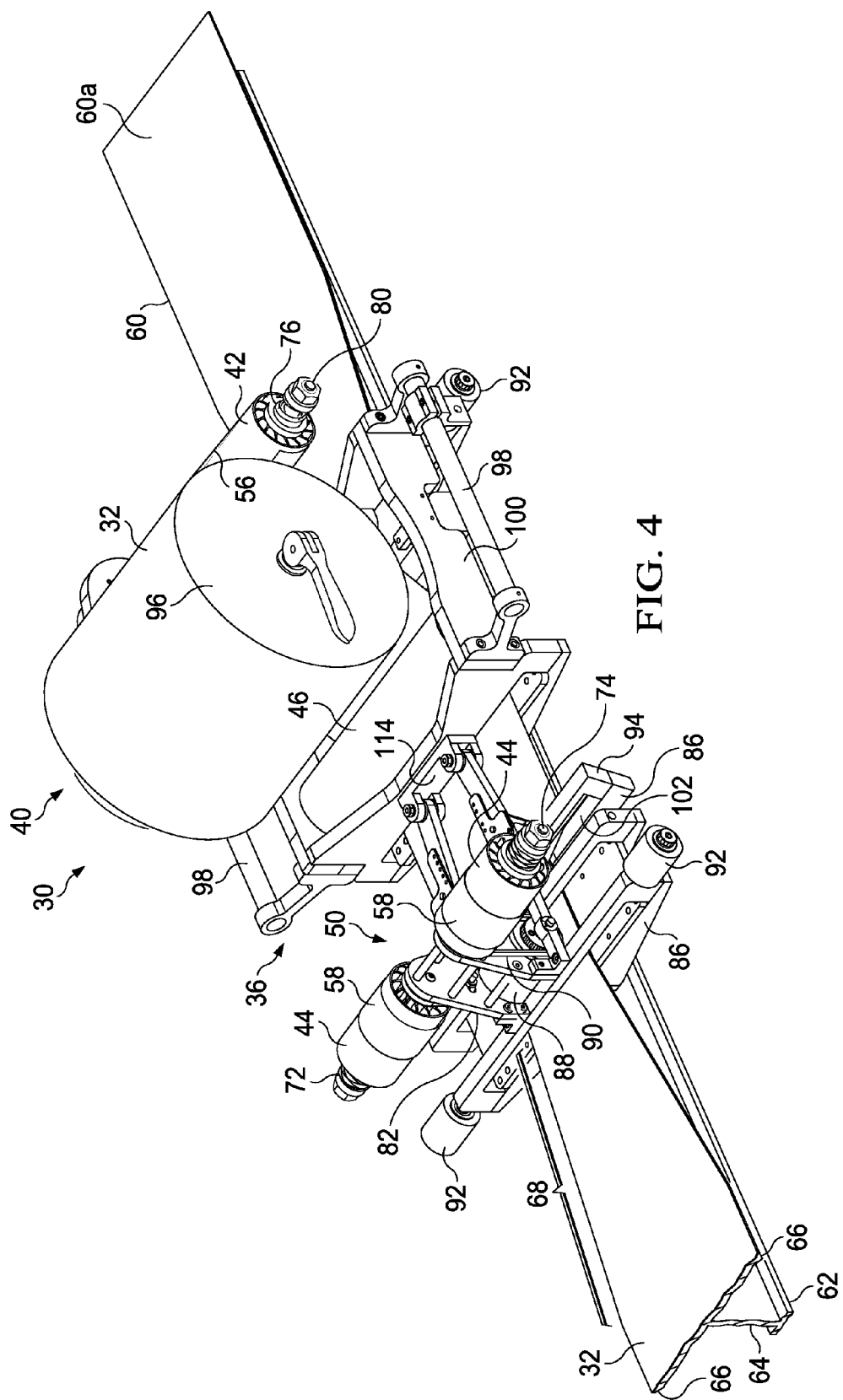
FIG. 4 is an illustration of an upper perspective view showing one side of the apparatus shown in FIG. 1 in the process of placing film on a stringer flange.
Figure 5:
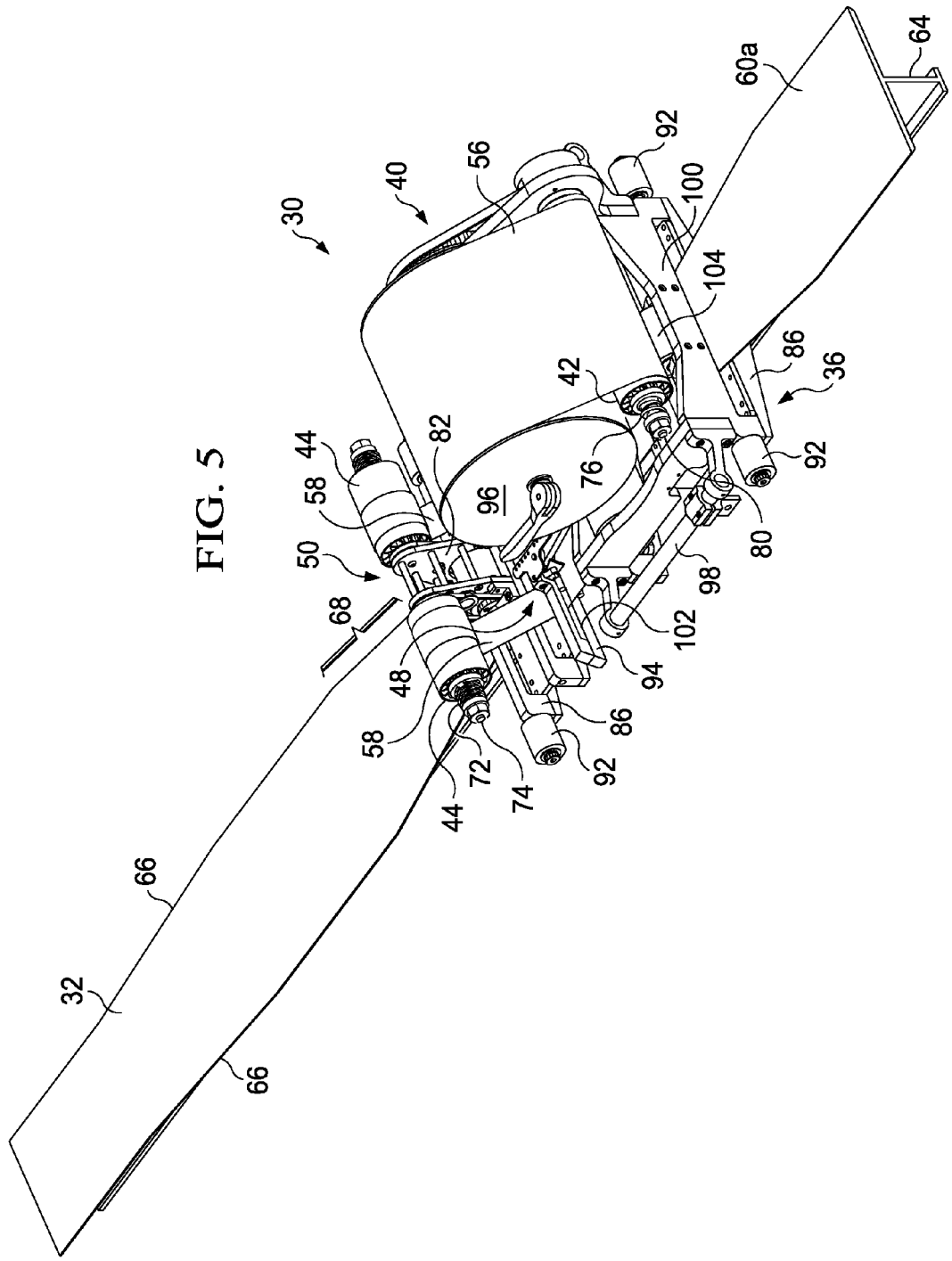
FIG. 5 is an illustration similar to FIG. 4 but showing the opposite side of the apparatus.
Figure 6:
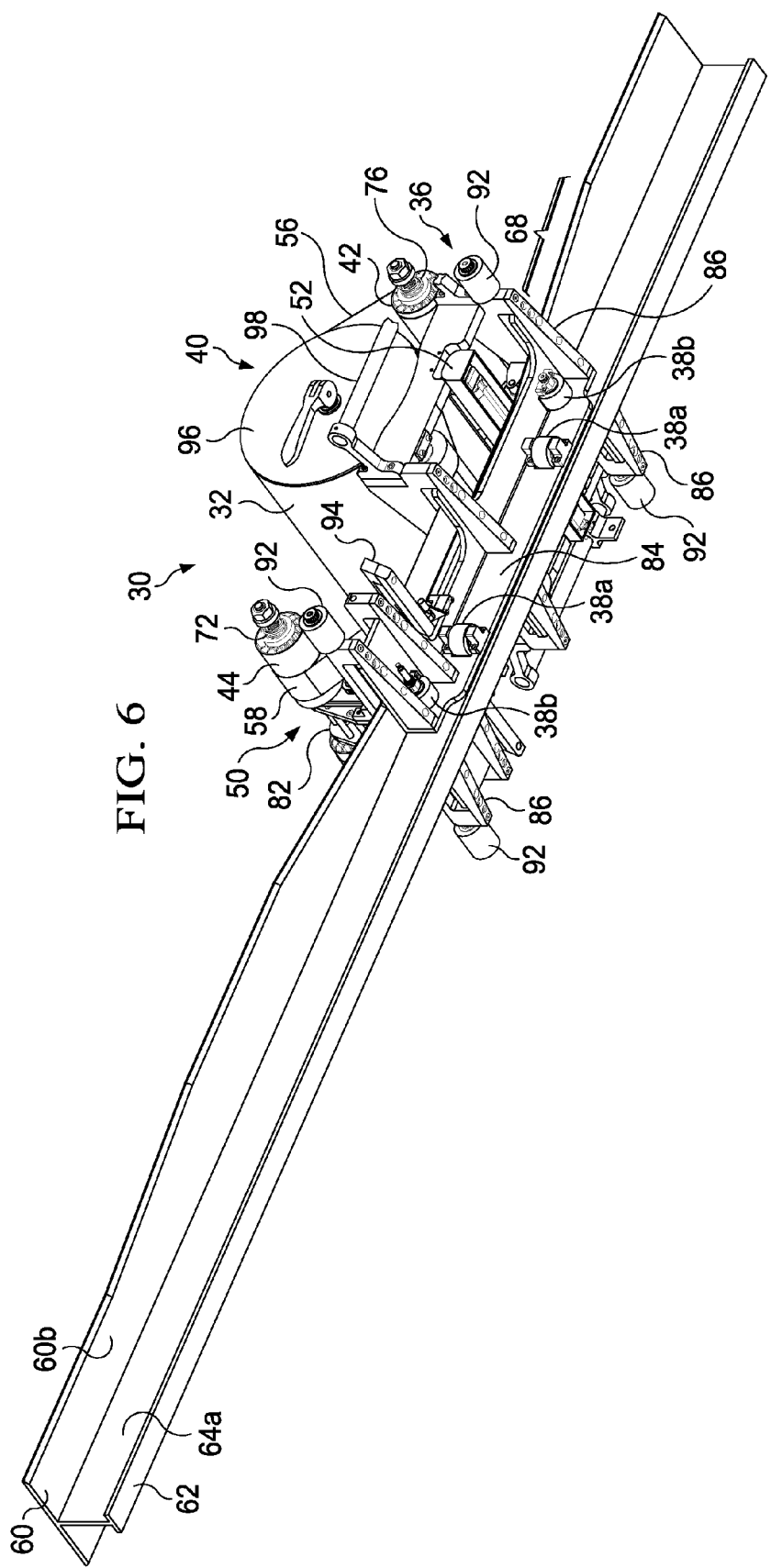
FIG. 6 is an illustration of a lower perspective view showing one side of the apparatus.
Figure 7:
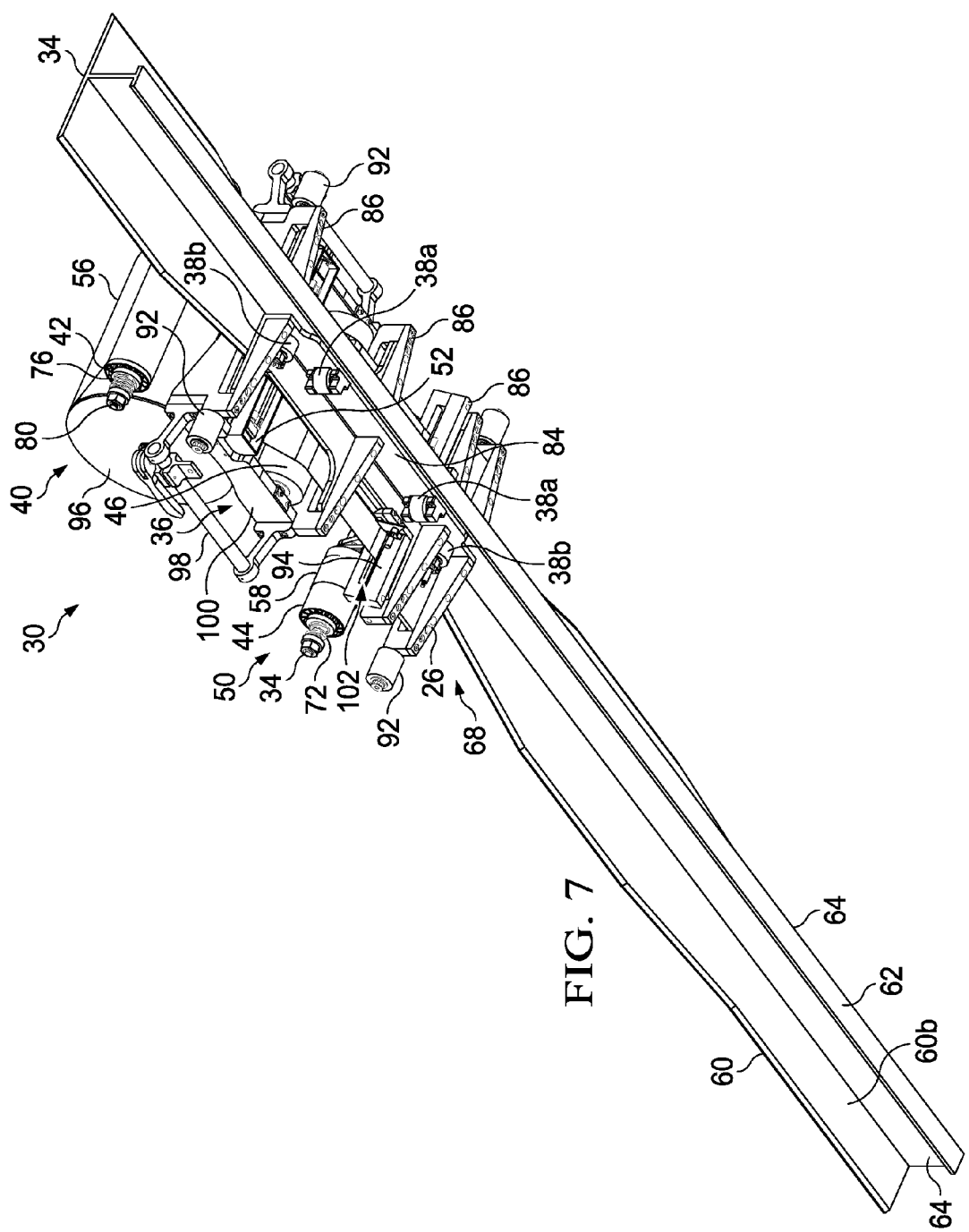
FIG. 7 is an illustration similar to FIG. 6 but showing the opposite side of the apparatus.
Figure 13:
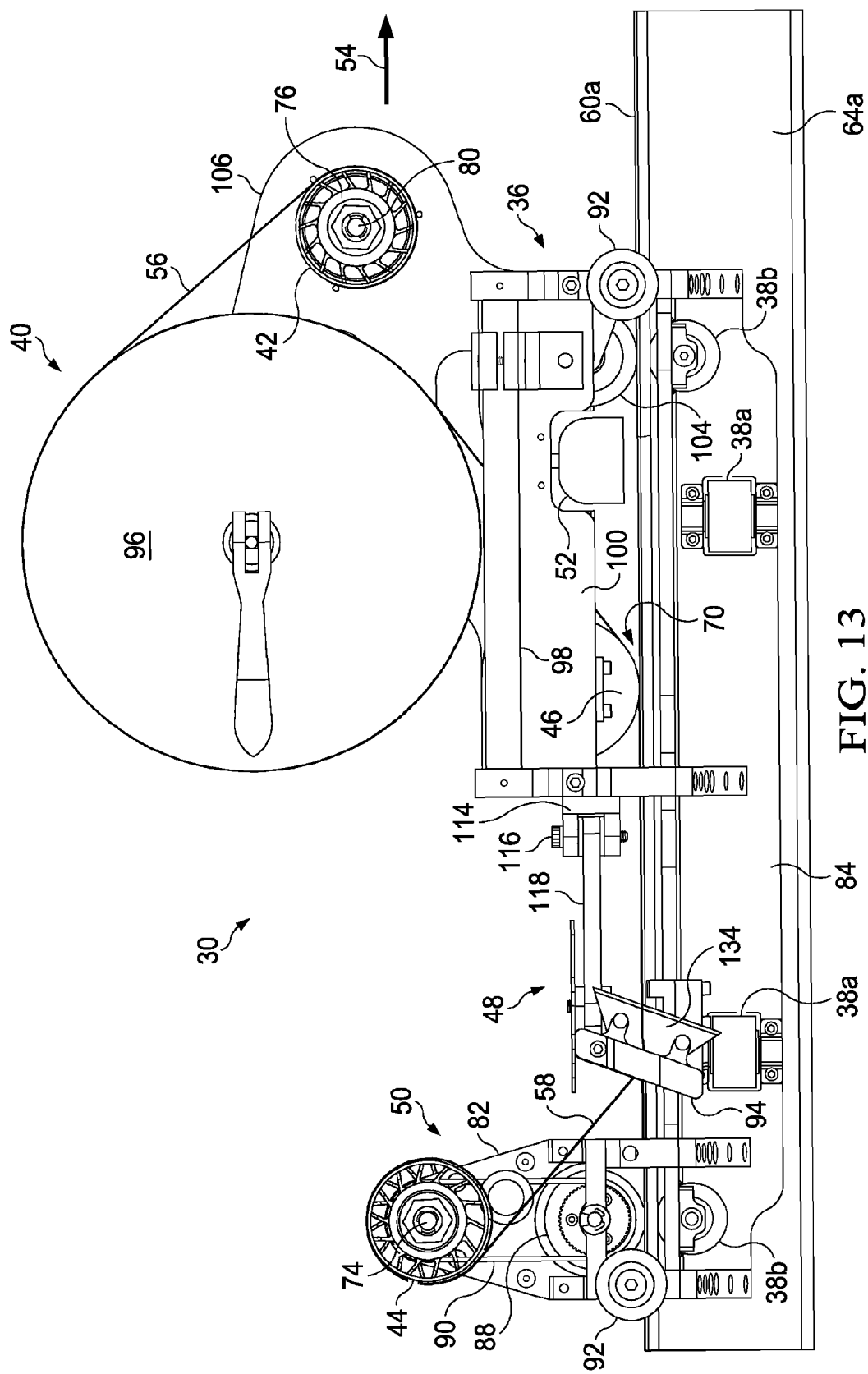
FIG. 13 is an illustration of an elevational view of one side of the apparatus.
Figure 14:
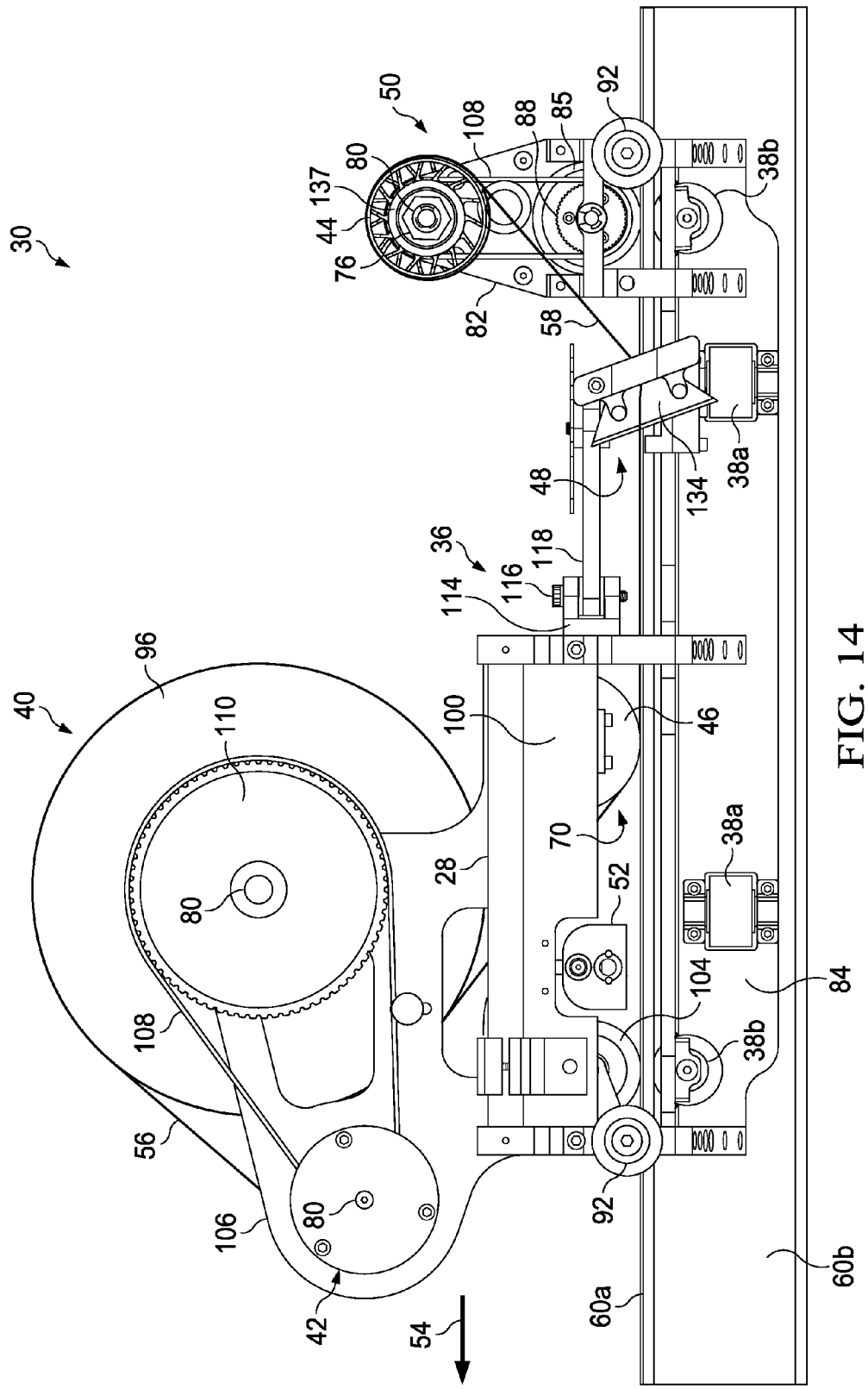
FIG. 14 is an illustration of an elevational view of the other side of the apparatus.

Referring to FIGS. 4, 13 and 14, the film feed roll assembly 40 broadly comprises a removable feed roll 96 on which a quantity of the film material 32 may be stored. A backer take-up reel 42 takes up and accumulates a protective backer 56 on the film material 32 as the film material 32 is drawn from the film feed roll 40 assembly. The film material 32 is fed into a nip (FIGS. 13 and 14) between the compaction roller 46 and the flange surface 60a as the carriage 36 moves along the elongate member 34 applying the adhesive film material. Although not shown in the drawings, the film material 32 may include a second protective backer on the opposite side of the adhesive film material that remains adhered to the film material 32 as it is compacted against the flange surface 60a.

Figure 17:
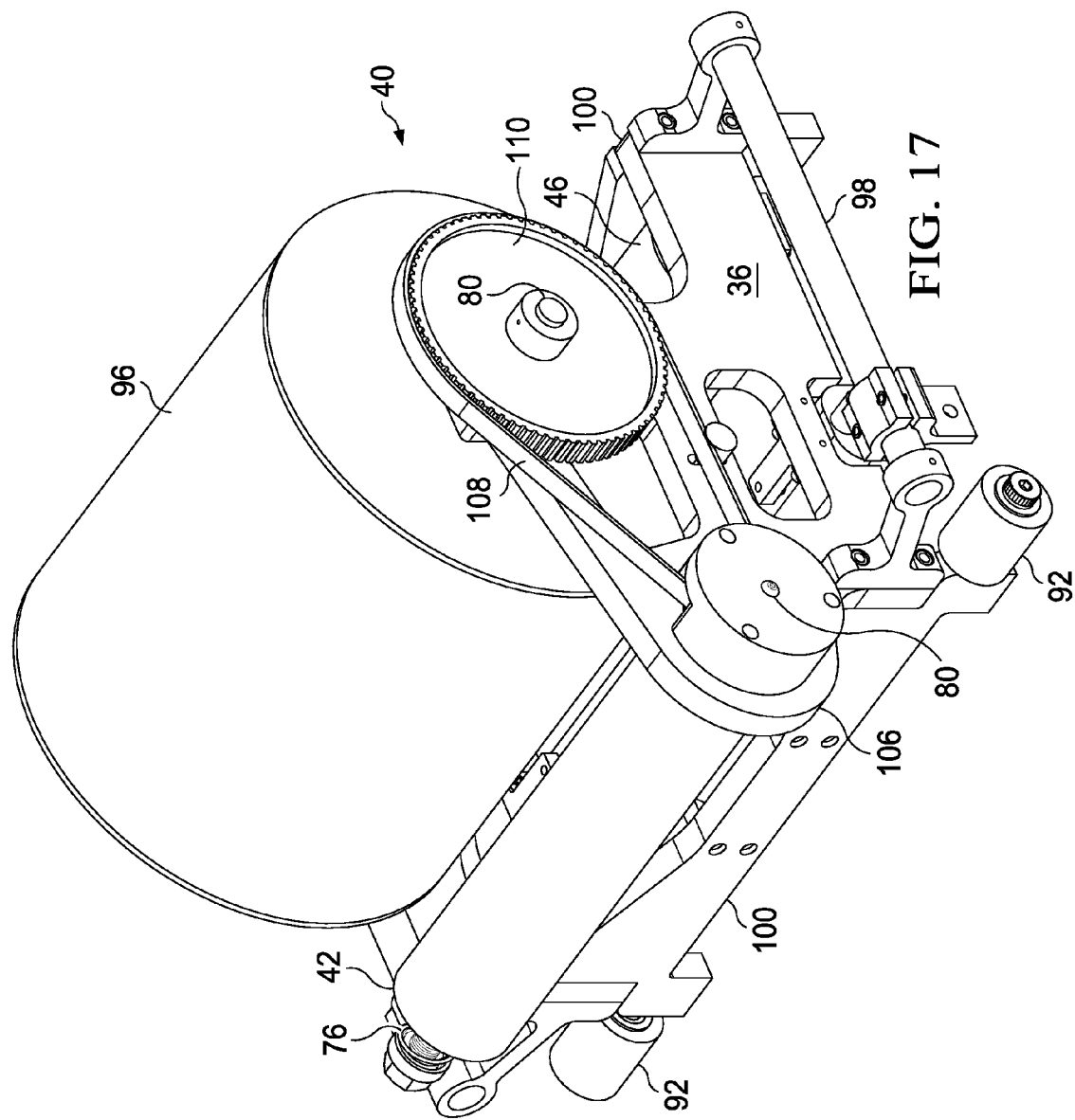
FIG. 17 is an illustration of a perspective view of the other side of the adhesive material feed roll assembly.
Figure 18:
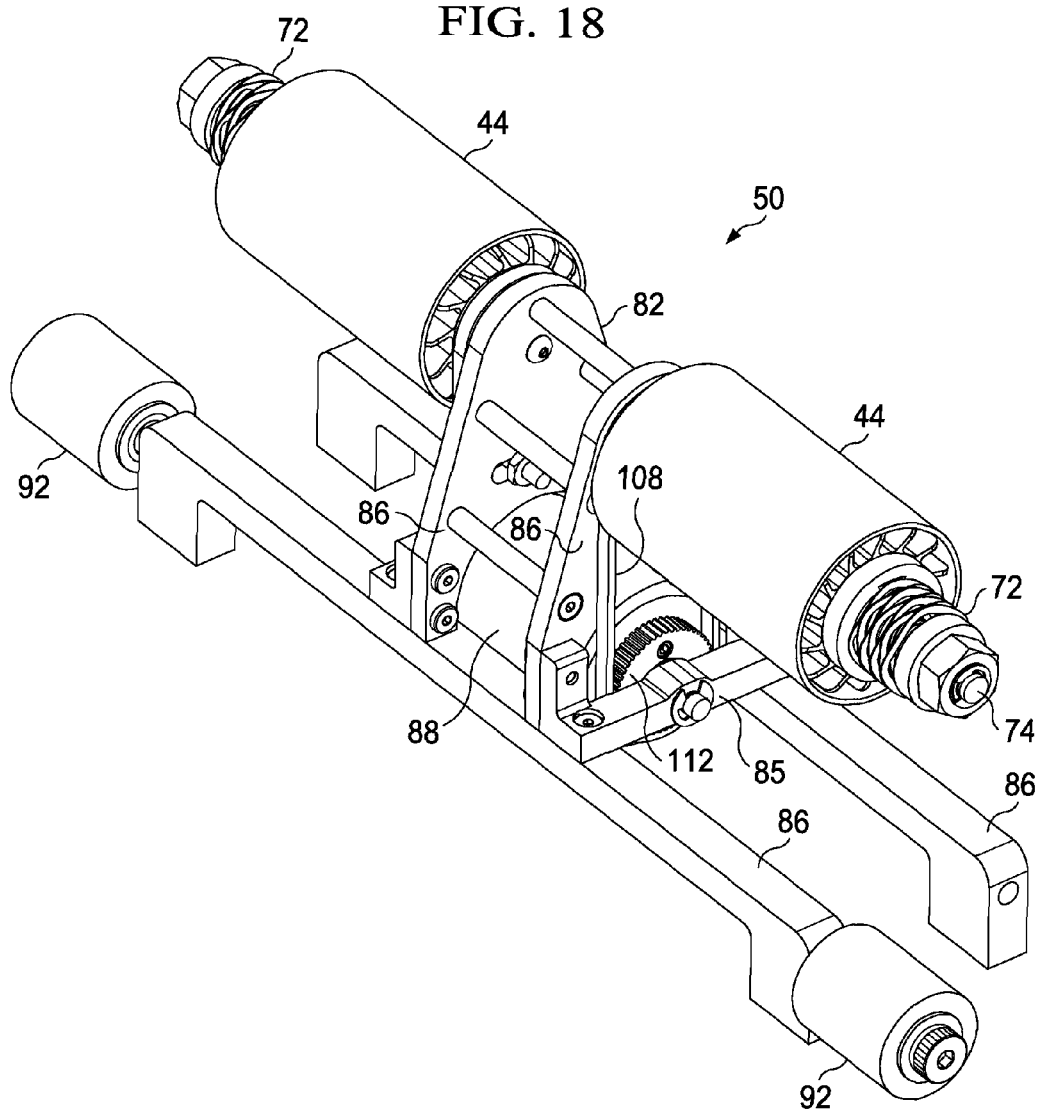
FIG. 18 is an illustration of a perspective view of the adhesive material scrap take-up assembly.
Figure 19:
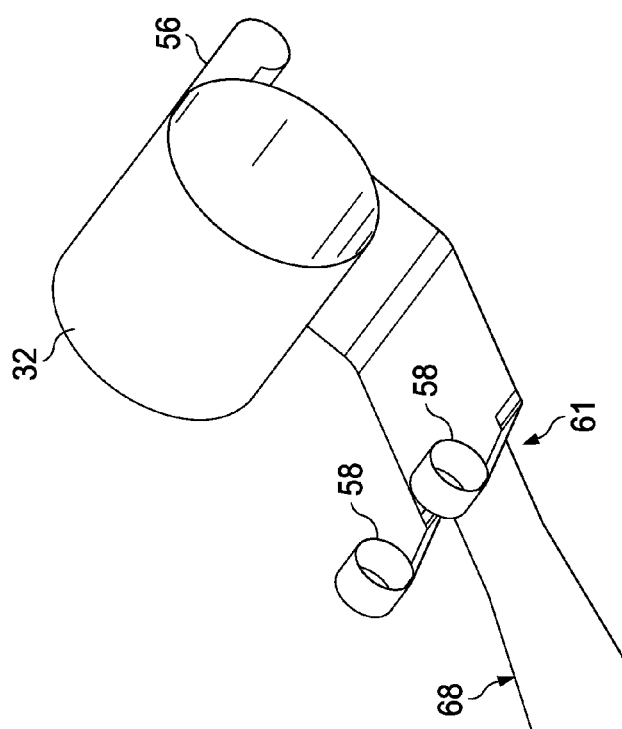
FIG. 19 is an illustration of a perspective view of the adhesive material, diagrammatically showing the portions that are dispensed, placed, trimmed and taken up.

Referring now particularly to FIGS. 6 and 13-17, the backer take-up reel 42 is mounted on a shaft 80 by a spring loaded slip clutch 76 which allows the take-up reel 42 to slip relative to the shaft 80 under certain conditions, discussed later. As best seen in FIGS. 14 and 17, the shaft 80 along with the feed roll 96 are journaled for rotation on a support bracket 106 mounted on the upper frame 100 of carriage 36. The shaft 80 is driven by a take-up reel drive belt 108 coupled with a toothed pulley 110 attached to and driven by rotation of the feed roll 96, so that normally, the backer take-up reel 42 rotates in synchronization with rotation of the feed roll 96 as the film 32 is drawn from the feed roll 96.

Referring now again to FIGS. 10, 13 and 14, the compaction roller 46 is journaled for rotation on the upper frame 100 and is adapted to bear against the flange surface 60a. Film 32 drawn from the feed roll 96 is fed to the nip 70 and then compacted against flange surface 60a by the compaction roller 46 so that the film 32 adheres substantially uniformly to flange surface 60a. Optionally, depending upon the application, suitable a heater 52, which may comprise, without limitation, an infrared heater, is mounted on the upper frame 100, forward of the compaction roller 46 and extends across substantially the entire width of the base flange surface 60a (FIG. 13). The heater 52 functions to heat the flange surface 60a in advance of placement of the film material 32 in order to promote adhesion of the film to the surface 60a. Other means of heating the base flange surface 60a immediately in advance of film placement may be possible.

A centrally located front traction tire 104 (FIGS. 5, 9, 13, 14) is journaled for rotation on the upper frame 100, and is positioned above the forward set of the pinch rollers 38b. Spring-loading of the forward set of pinch rollers 38b causes the front traction tire 104 to be drawn down against the base flange surface 60a, effectively "pinching" the base flange 60 between the front traction tire 104 and the forward set of pinch rollers 38b. Similarly the base flange 60 is pinched between the compaction roller 46 and the pinch rollers 38a, 38b.

Figure 8:
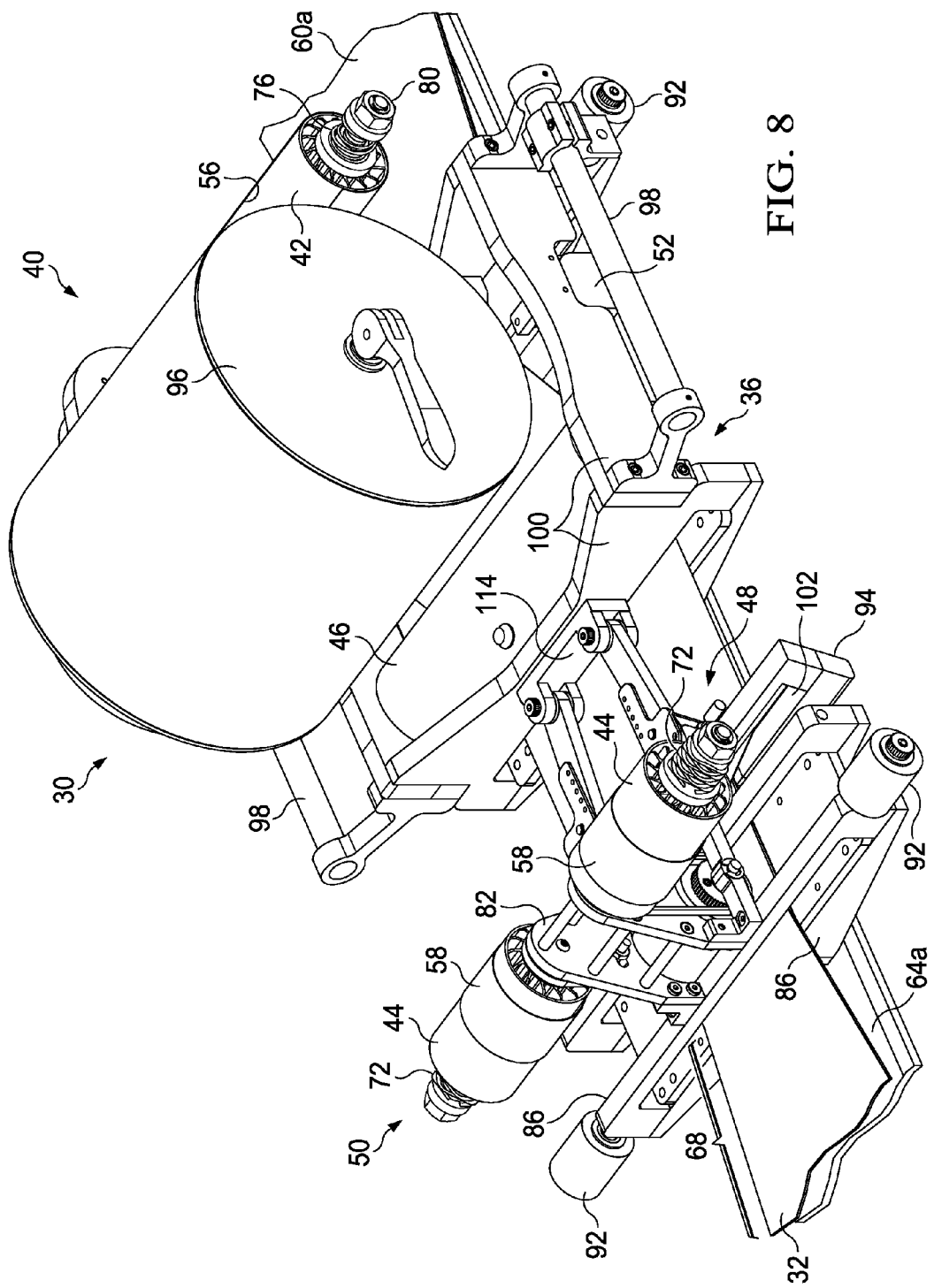
FIGS. 8-11 are illustrations respectively similar to FIGS. 4-7, but enlarged to show additional details of the apparatus.
Figure 9:
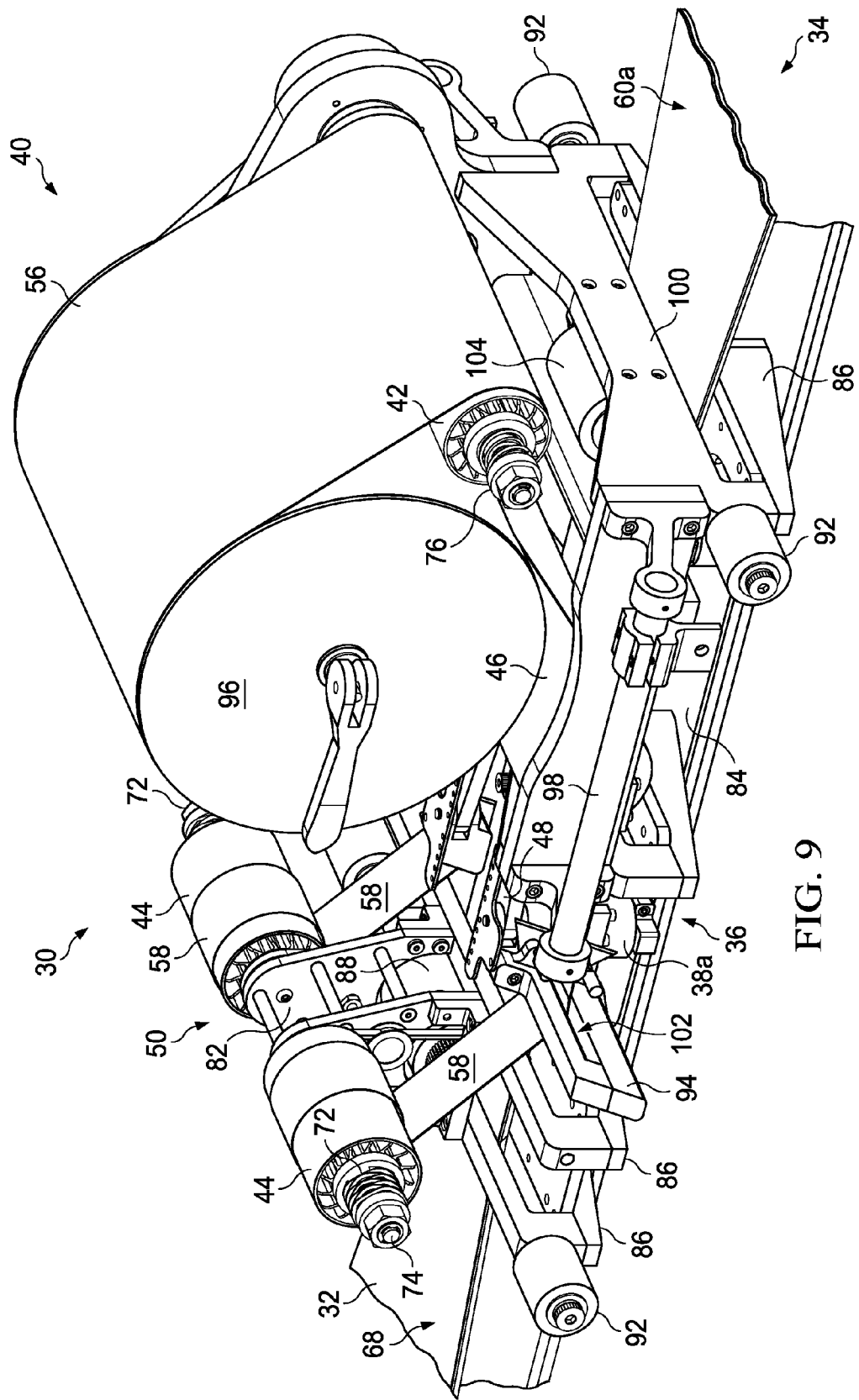
Figure 10:
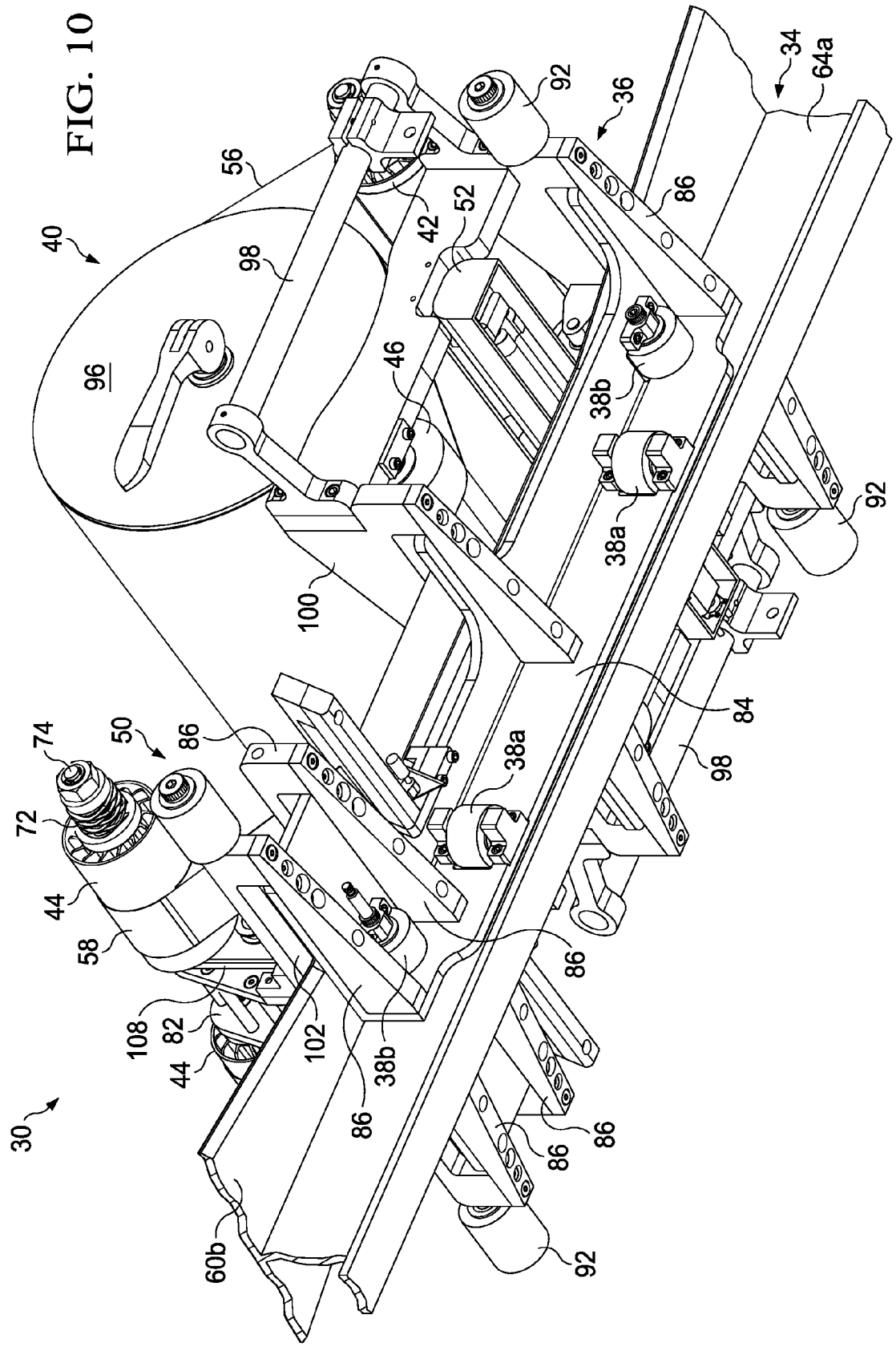
Figure 11:
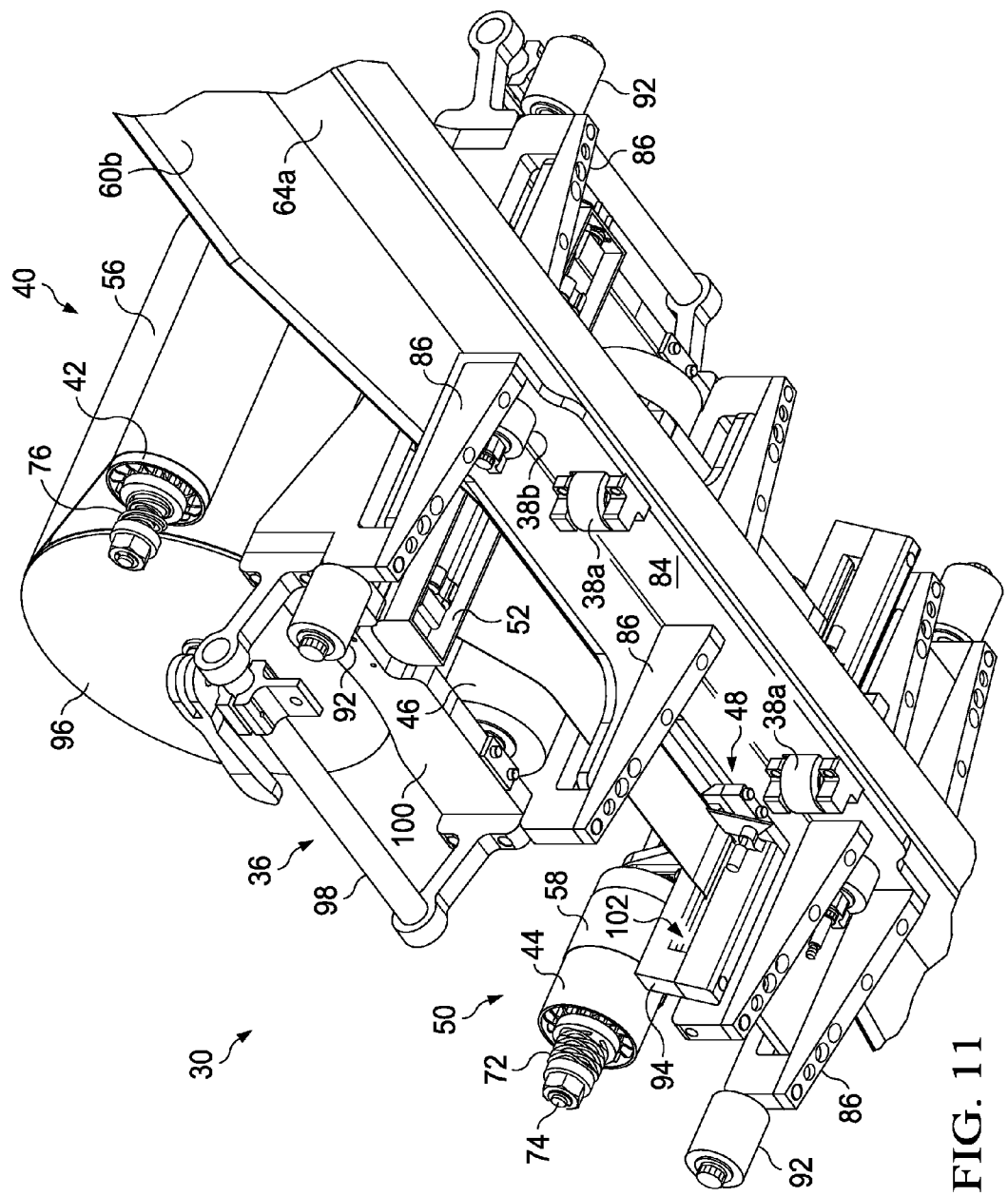
Figure 12:
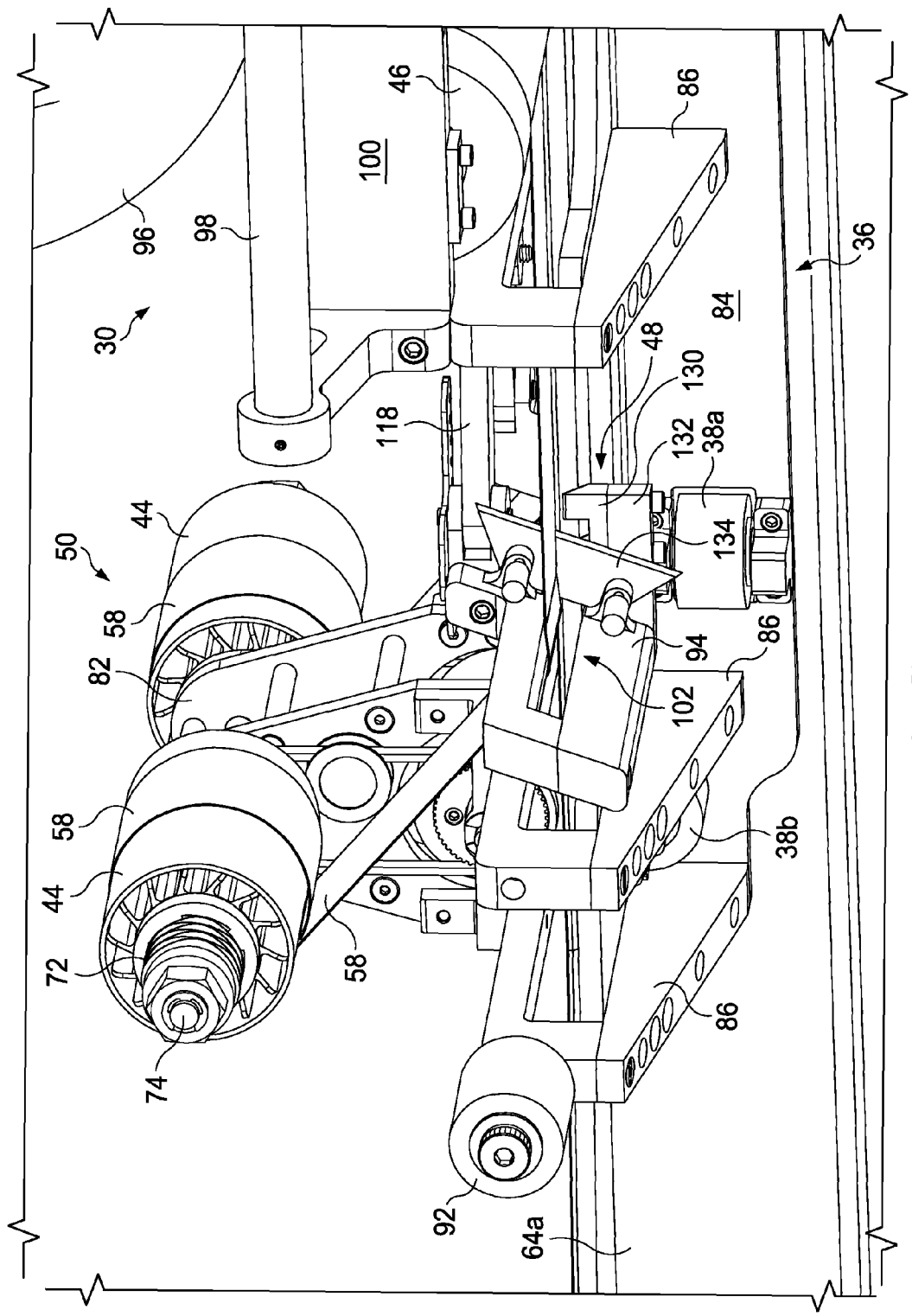
FIG. 12 is an illustration of a perspective view of the rear half of the apparatus, showing details of the film cutter assembly and film scrap take-up assembly.
Figure 15:
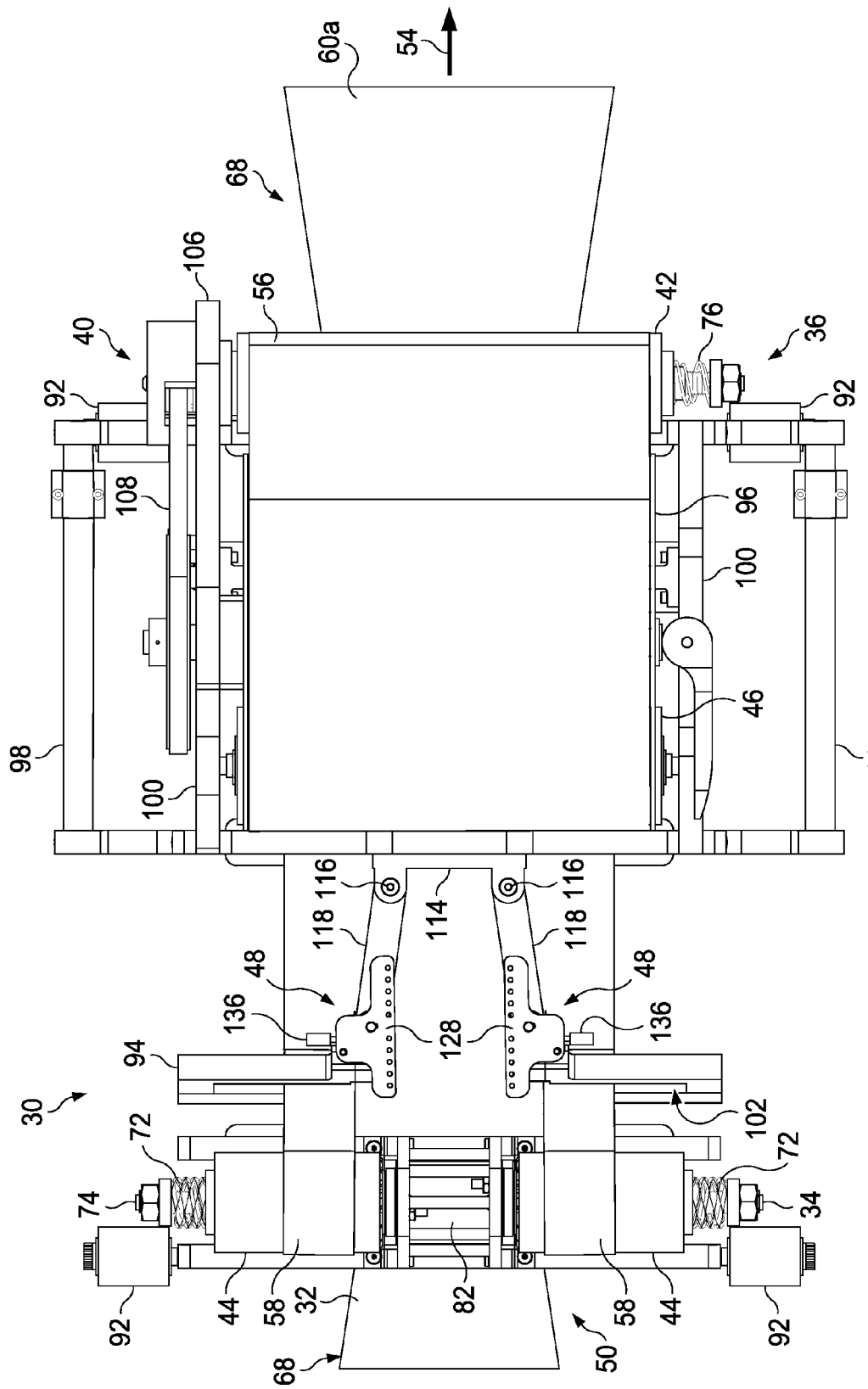
FIG. 15 is an illustration of a top plan view of the apparatus.
Figure 16:
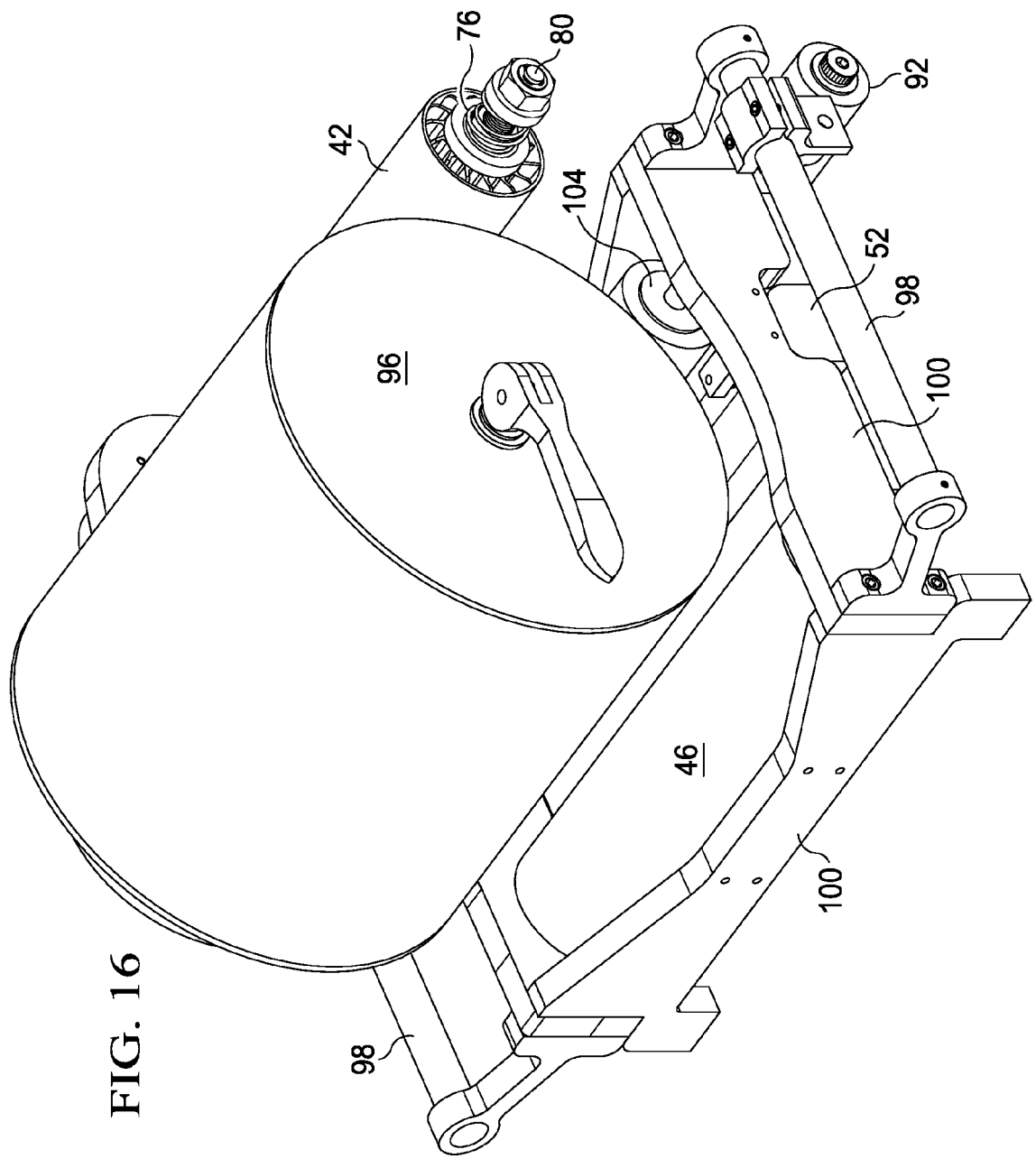
FIG. 16 is an illustration of a perspective view of one side of the adhesive material feed roll assembly.
Figure 20:
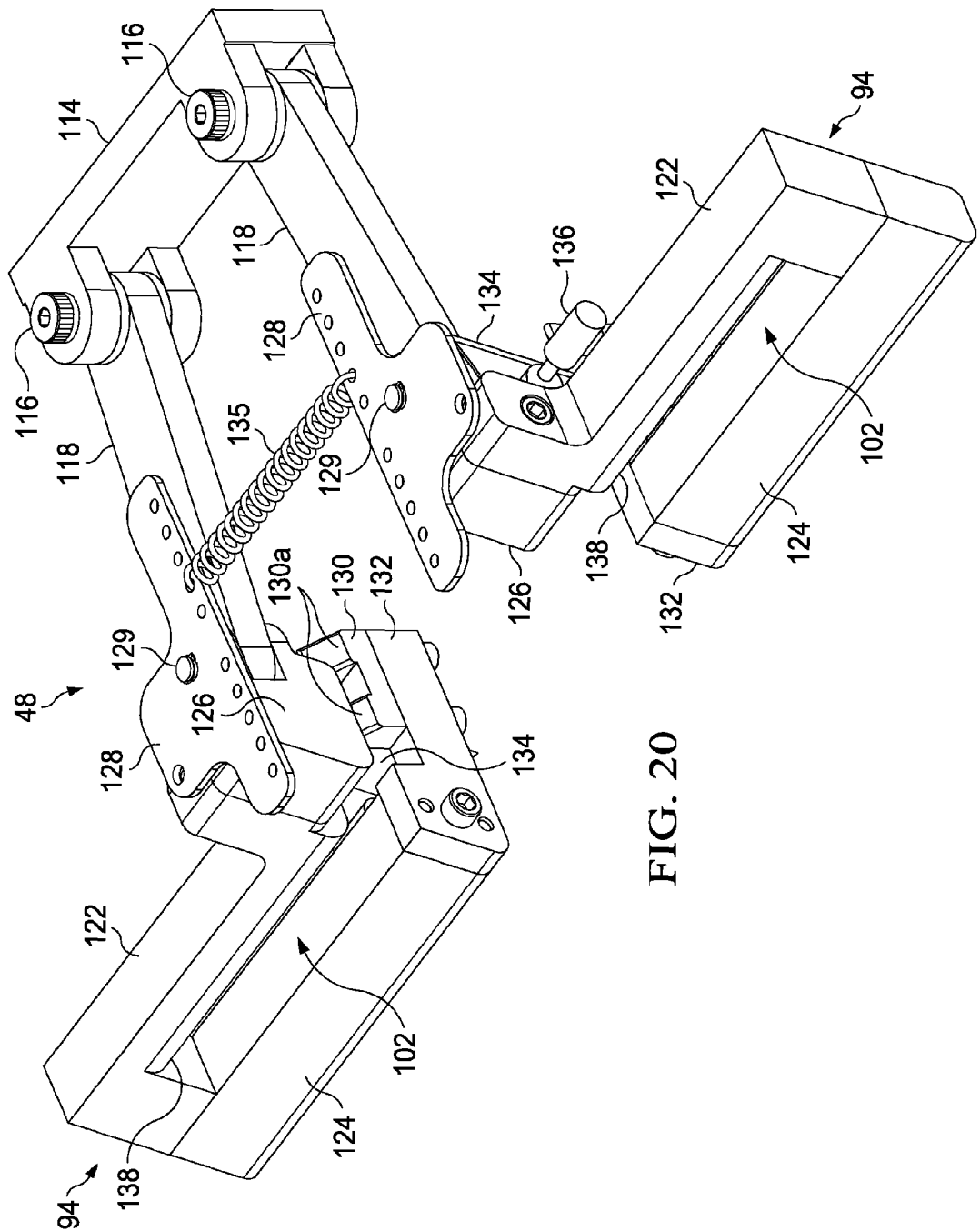
FIG. 20 is an illustration of a front perspective view of the adhesive material cutter assembly.
Figure 21:
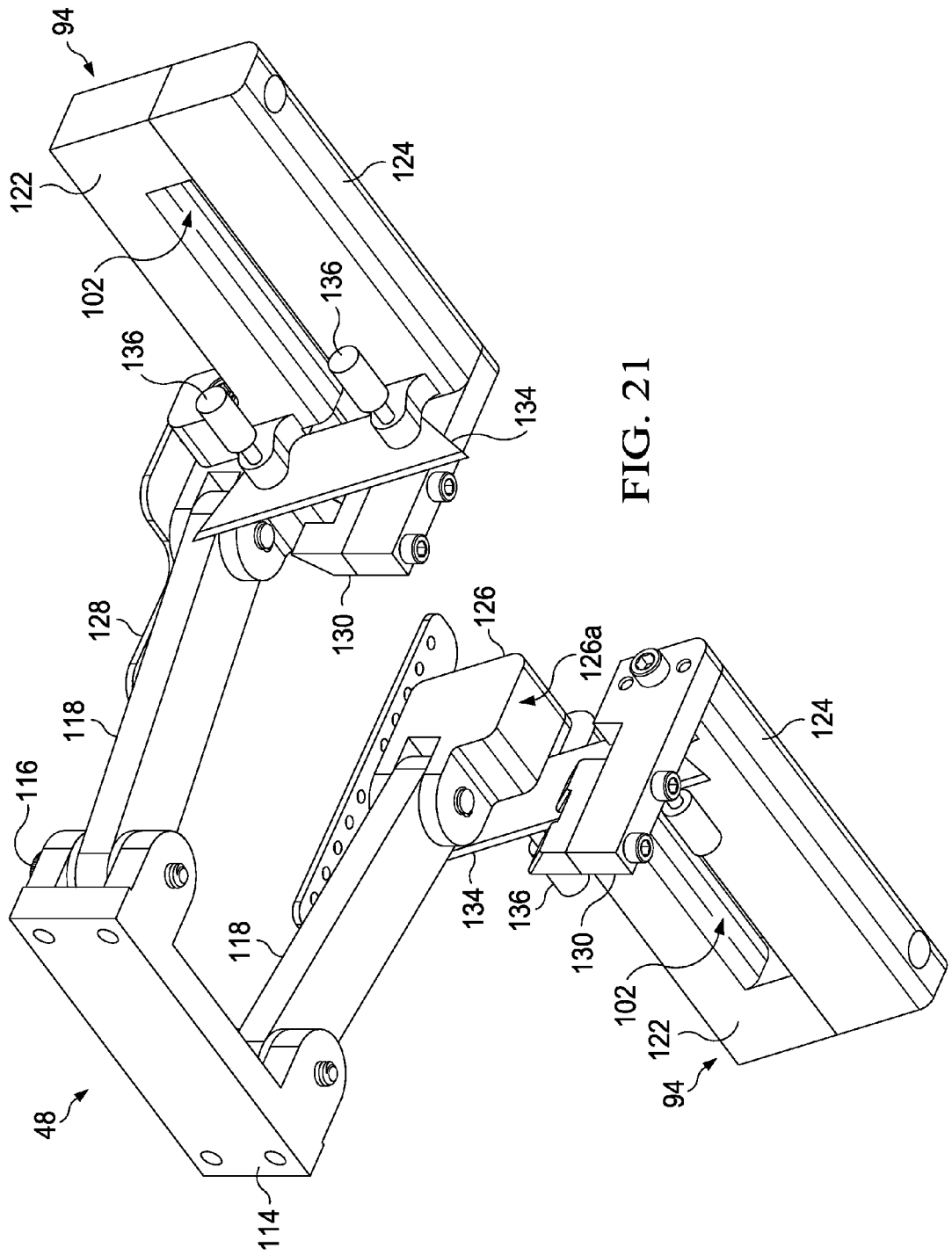
FIG. 21 is an illustration of a rear perspective view of the adhesive material assembly.
Figure 22:
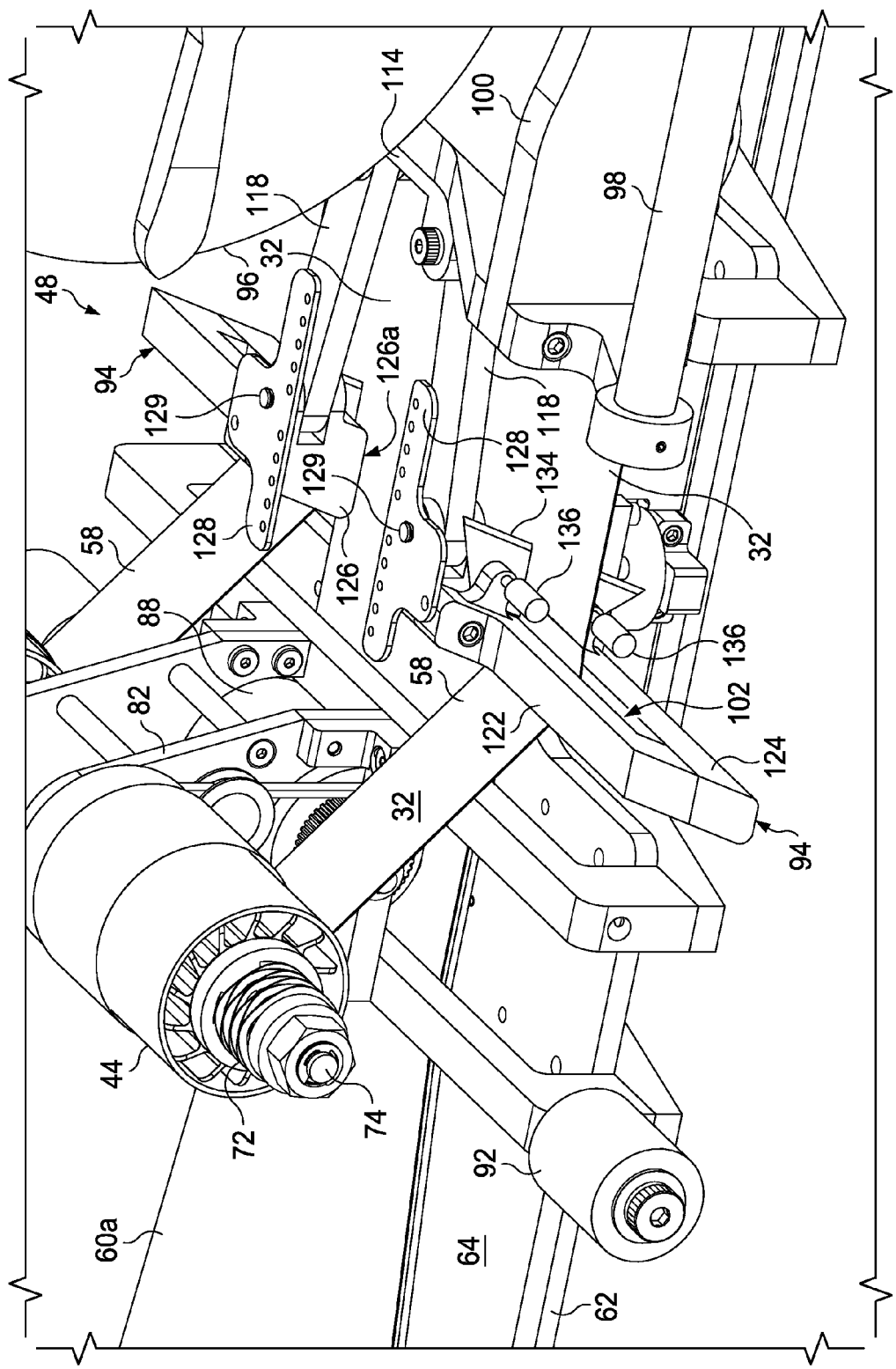
FIG. 22 is an illustration of a perspective view of the adhesive material cutter assembly shown in FIGS. 20 and 21, illustrating edges of an adhesive material being cut.

Referring now to FIGS. 8, 12-15, and 20-22, the film cutter assembly 48 comprises a pair of laterally spaced link arms 118 that are pivotally attached to a mounting bracket 114 by pivot pins 116. The mounting bracket 114 is fixed to the upper frame 100, as best seen in FIG. 8. Cutter follower arms 94 are pivotally attached to the outer ends of link arms 118 by followers 126 which are attached to link arms 118 by pivot shafts 129 (FIG. 20). Each of the followers 126 includes a lower guide surface 126a (FIGS. 21 and 22) which bears against, and guides the film 32 as the film 32 passes through the film cutter assembly 48 (FIG. 22). The lower guide surface 126a may be formed of a low friction material that is resistant to wear, such as, without limitation, a UHMW (ultrahigh molecular weight) polyethylene. Spring plates 128 are fixed to the followers 126 (FIGS. 15, 20 and 22). A spring 135 may be connected between the spring plates 128 in order to bias the link arms 118 to swing inwardly toward each other.

Each of the cutter follower arms 94 comprises an upper follower arm 122, and a lower follower arm 124 which are spaced apart from each other to form film guide slots 102 into which the outer edges of the film 32 is fed (FIGS. 15 and 21). Each of the upper follower arms 122 is provided with a bearing pad 138 which may be formed of a low friction material that is resistant to wear, such as UHMW polyethylene which is adapted to bear against the outer edges of the film 32 as it passes through the guide slots 102 in the cutter follower arms 94. Guide blocks 132 are attached to the ends of the lower follower arms 124. Follower blocks 130 are secured to the guide blocks 132 and include upper follower surfaces 130a that are respectively matched in geometry to the contour of the edges 66 of the elongate member 34.

Thus, in the illustrated example, the upper follower surfaces 130a are beveled to match and engage the beveled edges 66 (FIG. 3) of the elongate member 34, beneath the film 32. The upper beveled follower surfaces 130a of the follower blocks 130 may also include a layer of low friction material that is resistant to wear such as UHMW polyethylene. Cutter knives 134 (FIGS. 20 and 22), made of suitable wear resistant material such as carbide, are releasably attached to the cutter follower arms 94 by thumbscrews 136 which hold the knives 134 against the followers 126, follower blocks 130 and guide blocks 132. Moving the film material applicator 30 along the elongate member 34 forces the cutter knives 134 through the film material 32 (including any backer(s) that may be present on the film material 32), thereby trimming the film material 32 to match the width of the base flange surface 60a along the length of the elongate member 34. The cutter knives 134 are guided by the beveled follower surfaces 130a on the follower blocks 130 which are biased into sliding engagement with the beveled edges 66 (FIG. 3) of the elongate member 34. Pivotal mounting of the beveled follower surfaces 130a together with the cutter knives 134 allows the cutter knives 134 to individually follow and cut the film material 32 along the opposite beveled edges 66 of the elongate member 34, thereby matching the cut width of the film material 32 to the geometry of the top flange 60.

Attention is now directed to FIGS. 12, 13, 15, and 18 which illustrate additional details of the film scrap take-up assembly 50. A pair of scrap take-up rollers 44 are mounted on a shaft 74 by means of a slip clutch 72 that allows the rollers 44 to slip relative to the shaft 74 under certain conditions described later in more detail. The shaft 74 is journaled for rotation on an upright take-up support bracket 82 that is attached to an adjacent pair of the mounting brackets 86. A rear traction tire 88 may be made of any suitable material that achieves traction against the film 32. The rear traction tire 88 is mounted for rotation on a pair of laterally spaced arms 85 (see FIGS. 14 and 18) attached to brackets 86. A gear wheel 112 attached to the end of the traction tire 88 is connected by a take-up reel drive belt 108 to a gear wheel 137 (FIG. 14) on the shaft 74. Rotation of the traction tire 88 as a result of rolling over the film 32 during the film placement process drives rotation of the take-up rollers 44 through drive belt 108.

In operation, a supply of the film material 32 is loaded onto the feed roll 96 in preparation for covering the flange surface 60 of the elongate member 34 with material. As previously discussed, the elongate member 34 may be placed in a holding system 155 fixture 156 (FIGS. 25-26) that is designed to hold the elongate member 34 in a fixed, weight neutral, inverted position during the film placement process. The film applicator 30 is loaded onto one end of the elongate member 34 and the film 32 is drawn down and into the nip 70 (FIG. 13) between the compaction roller 46 and the flange surface 60a, while the backer 56 is separated and partially wrapped around the backer take-up reel 42. In cases where a fixture 156 is used to hold the elongate member 34, the outrigger rollers 92 may be placed on the fixture 156 in preparation for rolling the film applicator 30 down the length of the elongate member 34.

Workers grasp the handle bars 98 to move the film applicator 30 along the length of the elongate member 34. In some embodiments, however, it may be possible to move the film applicator 30 along the stringer 34 automatically using computer controlled equipment, modifications to incorporate self-powering operation, or other automated equipment). The heater 52 heats the flange surface 60a immediately ahead of the compaction roller 46. Linear movement of the film applicator 30 draws film material 32 from the film feed roll 96. As the film material 32 is fed to the compaction roller 46, the backer 56 is taken up on the backer take-up reel 42 which is belt driven by the rotation of the feed roll 96. In the event that the feed roll 96 rotates more quickly than the backer take-up reel 42, the slip clutch 76 allows dynamic slipping of the backer take-up reel 42.

Figure 23:
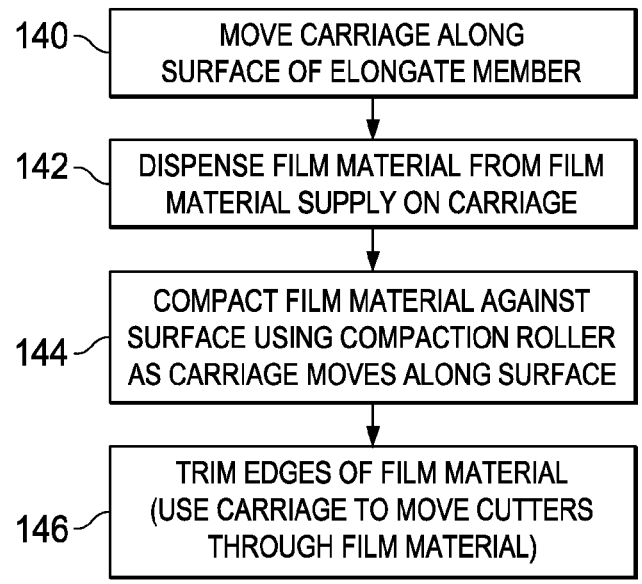
FIG. 23 is an illustration of a flow diagram of an embodiment of a method of applying an adhesive material along a surface of an elongate member.
Figure 24:
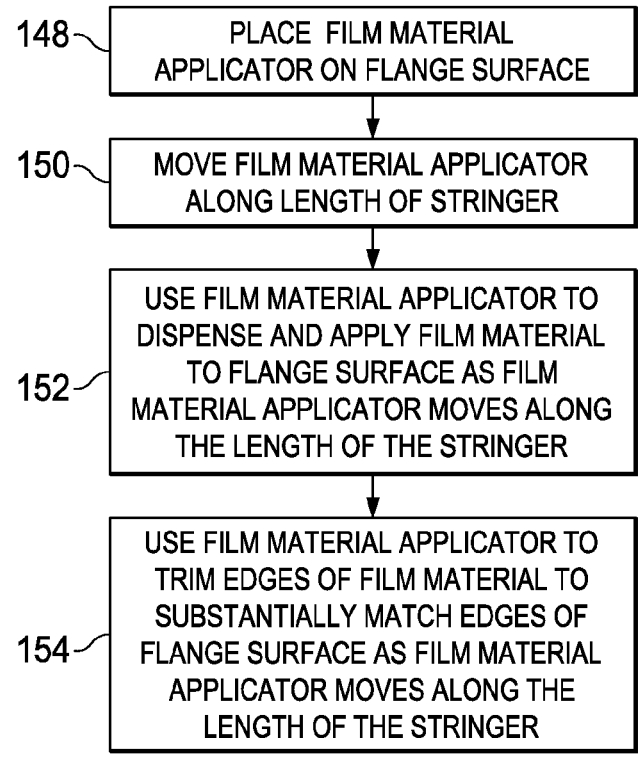
FIG. 24 is an illustration of a flow diagram of a method of using the adhesive material applicator to apply material on the flange of a stringer.

After the film 32 has been compacted beneath the compaction roller 46, the film cutter assembly 48 trims away edges of the film 32 to match the width of the flange surface 60a, even in cases where the width of the base flange surface 60a may vary along the length of the elongate member 34. As best seen in FIG. 22, inward biasing of the link arms 118 results in the cutter knives 134 cutting the film 32 at the edges of the base flange surface 60a. The film scrap 58 passes through the guide slots 102 in the cutter follower arms 94 and is taken up on the scrap take-up rollers 44. The scrap take-up rollers 44 are belt driven by the rear traction tire 88. In the event that the scrap take-up rollers 44 rotate more slowly than the rear traction tire 88, the slip clutch 72 allows dynamic slipping of the rollers 44. FIGS. 23 and 24 diagrammatically illustrates processing of the film 32 during the film material placement process. The film material 32 is drawn from the feed roll 96 and the backer 56 is rolled up on the backer take-up reel 42. The film 32 is compacted and then cut at 61. Film scrap 58 is rolled up onto the film scrap take-up reels 44 as the film 32 is cut to match the width of the flange surface 60a, including along the flange taper 68.

FIG. 23 illustrates the overall steps of a method of applying film 32 to the surface 60a of an elongate member 34 using the disclosed apparatus. At 140, a carriage 36 is movable linearly along the surface 60a of the elongate member 32, and at 142 the film 32 is dispensed from a film supply 40 on the carriage 36. At 144 the film 32 is compacted against the surface 60a using a compaction roller 46 as the carriage 36 moves along the surface 60a. At step 146, the edges of the film are trimmed, using the carriage 36 to move cutter knives 134 through the film 32.

FIG. 24 illustrates the overall steps of a method of applying film material 32 over the length of a base flange surface 60a on a composite elongate member 34 using the disclosed apparatus. Beginning at 148, a film material applicator 30 is placed on the flange surface 68a. At 150, the film applicator 30 is moved along the length of the elongate member 34. At 152 the film applicator 30 is used to dispense and apply film material 32 to the flange surface 60a as the film applicator 30 moves along the length of the elongate member 34. At 154, the film applicator 30 is used to trim edges of the film material 32 to substantially match edges of the flange surface 60a as the film applicator 30 moves along the length of the stringer 34.

Figure 25:
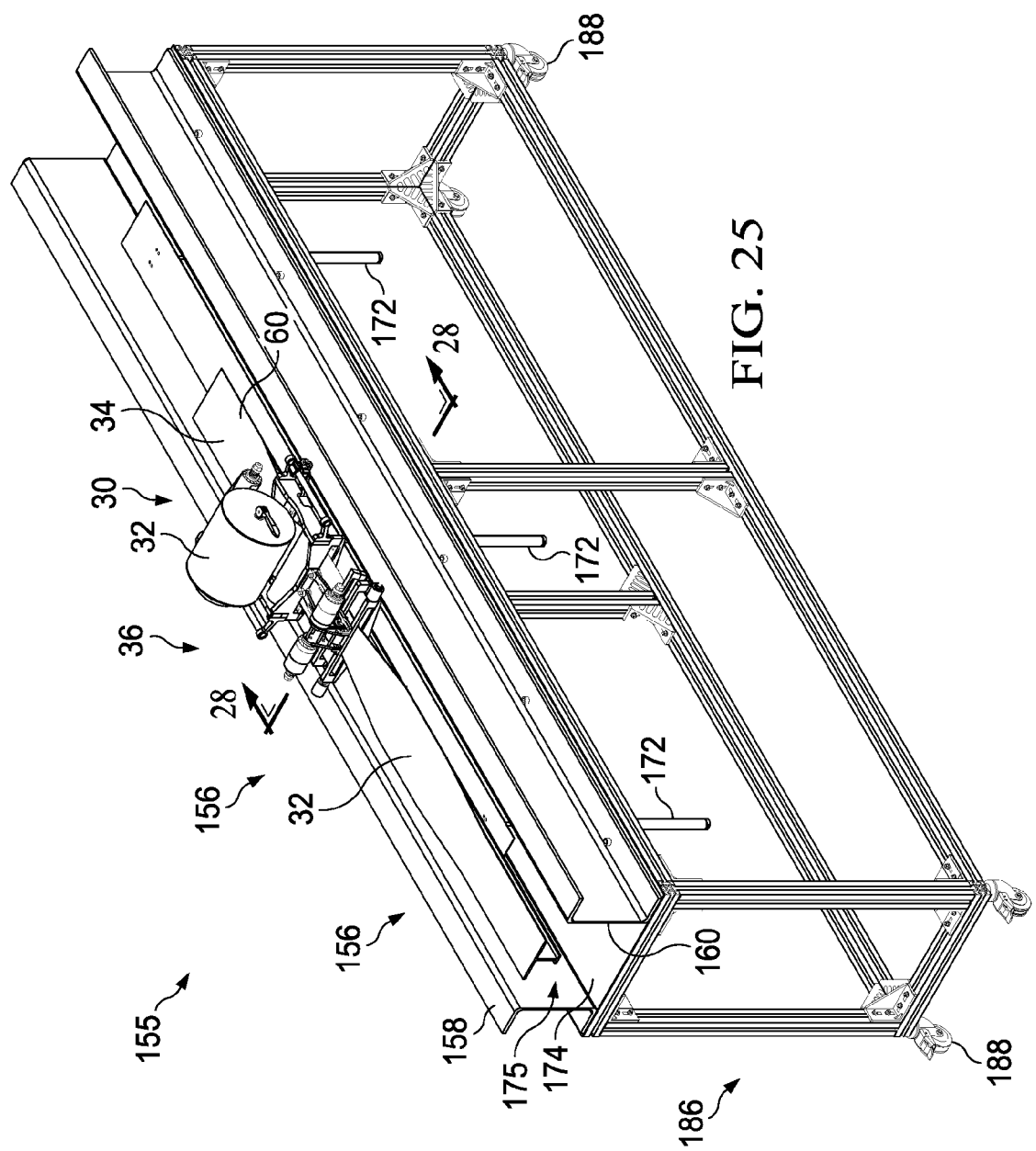
FIG. 25 is an illustration of a perspective view of one side of the apparatus, shown mounted on a fixture for holding the elongate member.
Figure 26:
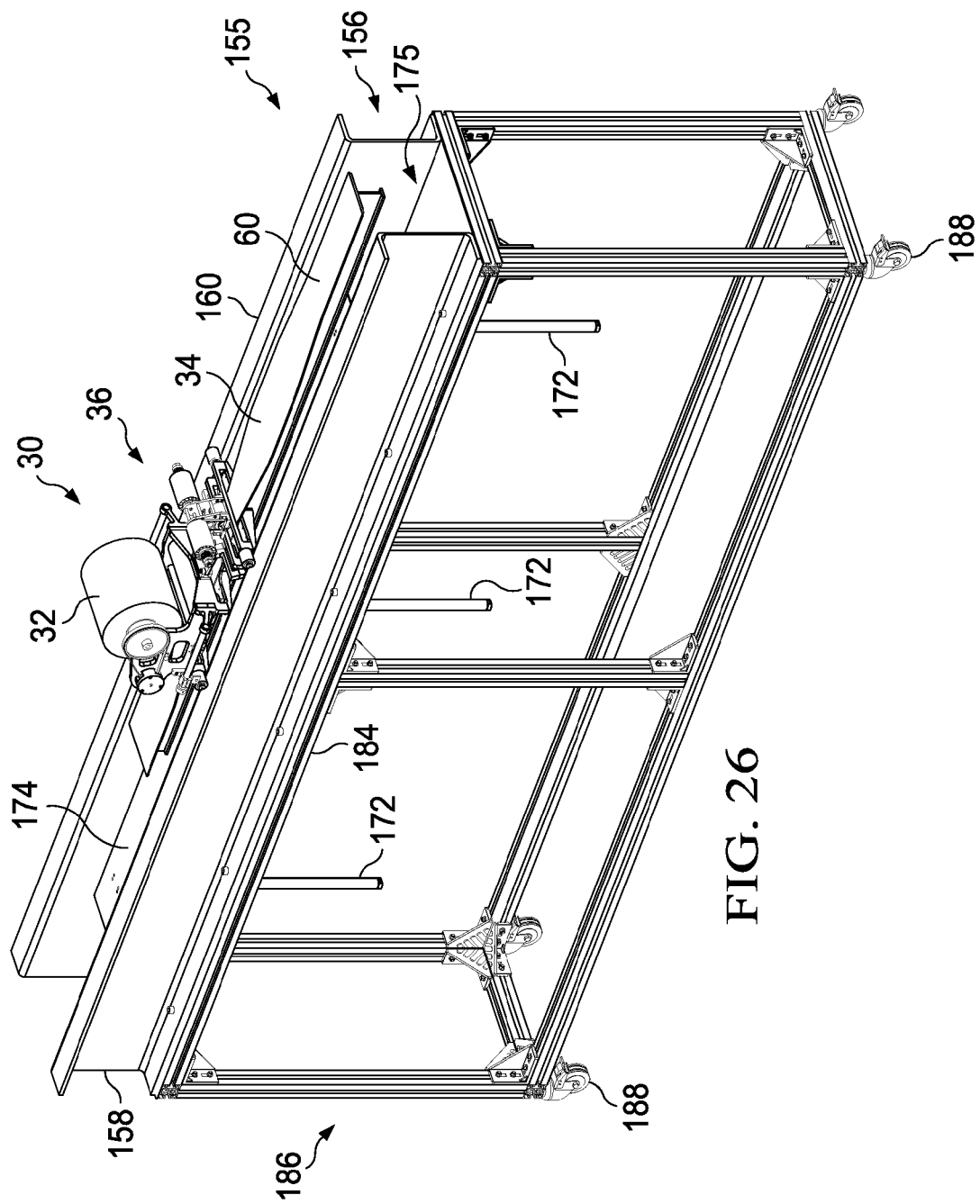
FIG. 26 is an illustration of a perspective view similar to FIG. 25 but showing the opposite side of the apparatus and the holding fixture.

Attention is now directed to FIGS. 25 and 26 which illustrate a holding system 155 that may be used to hold the elongate member 34 as the film applicator 30 applies film material 32 to the top flange 60 of the elongate member 34. While an aircraft stringer 34 is illustrated as the elongate member, the disclosed holding system 155 may be employed to hold and stabilize any of a variety of the elongate members in a desired, weight-neutral position while a processing operation is being performed on the elongate member 34. The material applicator 30 is only an example of various equipment that may be used in processing the elongate member 34 while being held by the holding system 155.

The holding system 155 includes a holding fixture 156, which may be mounted on a table 184 supported in an elevated position on a frame 186. The frame 186 may include wheels 188 allowing transport. The holding fixture 156 includes a pair of spaced apart beams 158, 160 mounted on a base 174. In some embodiments, the beams 158, 160 and the base 174 may be integrated together as a single structure. The spaced apart beams 158, 160 define a channel 175 therebetween within which the stringer 34 may be placed and held in a desired position during a process operation, such as during the application of the adhesive film 32 previously described. As will be discussed below in more detail, the holding fixture 156 functions in combination with the carriage 36 to hold the elongate member 34 in a desired weight-neutral position and constrain it during the application process. In the illustrated example, the elongate member 34 is held and stabilized in an inverted position, such that the top flange 60 is exposed, and is presented to the material applicator 30 at a position that allows adhesive film 32 to be applied to the elongate member 34, while maintaining the elongate member 34 in a substantially weight neutral position during the application process. The vertical position at which the elongate member 34 is supported relative to the applicator 30 may be adjusted using actuators 172, discussed in more detail below.

Figure 27:
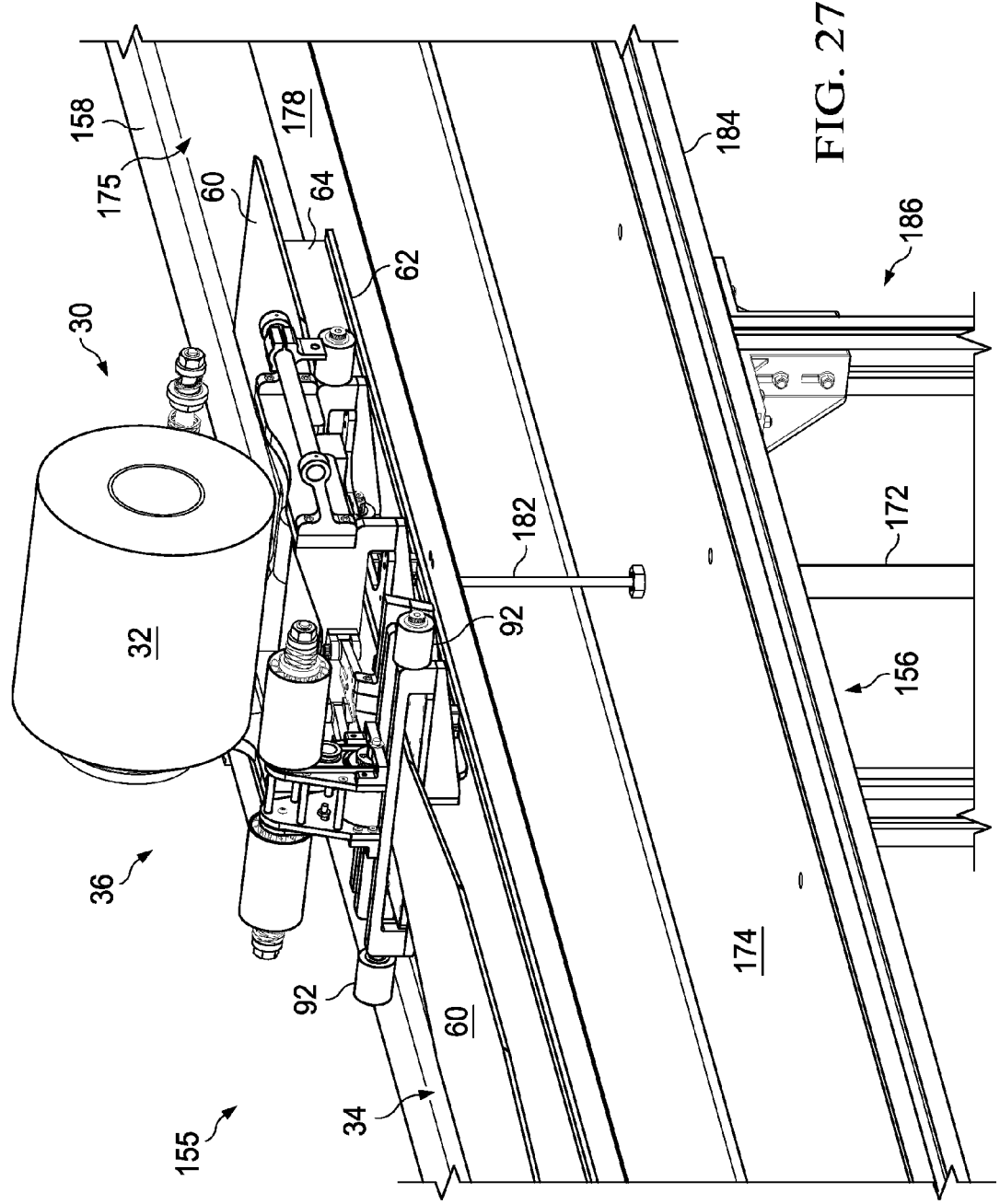
FIG. 27 is an illustration of a perspective view of the apparatus and holding fixture shown in FIGS. 25 and 26, one of the beams of the holding fixture having been removed for clarity.
Figure 28:
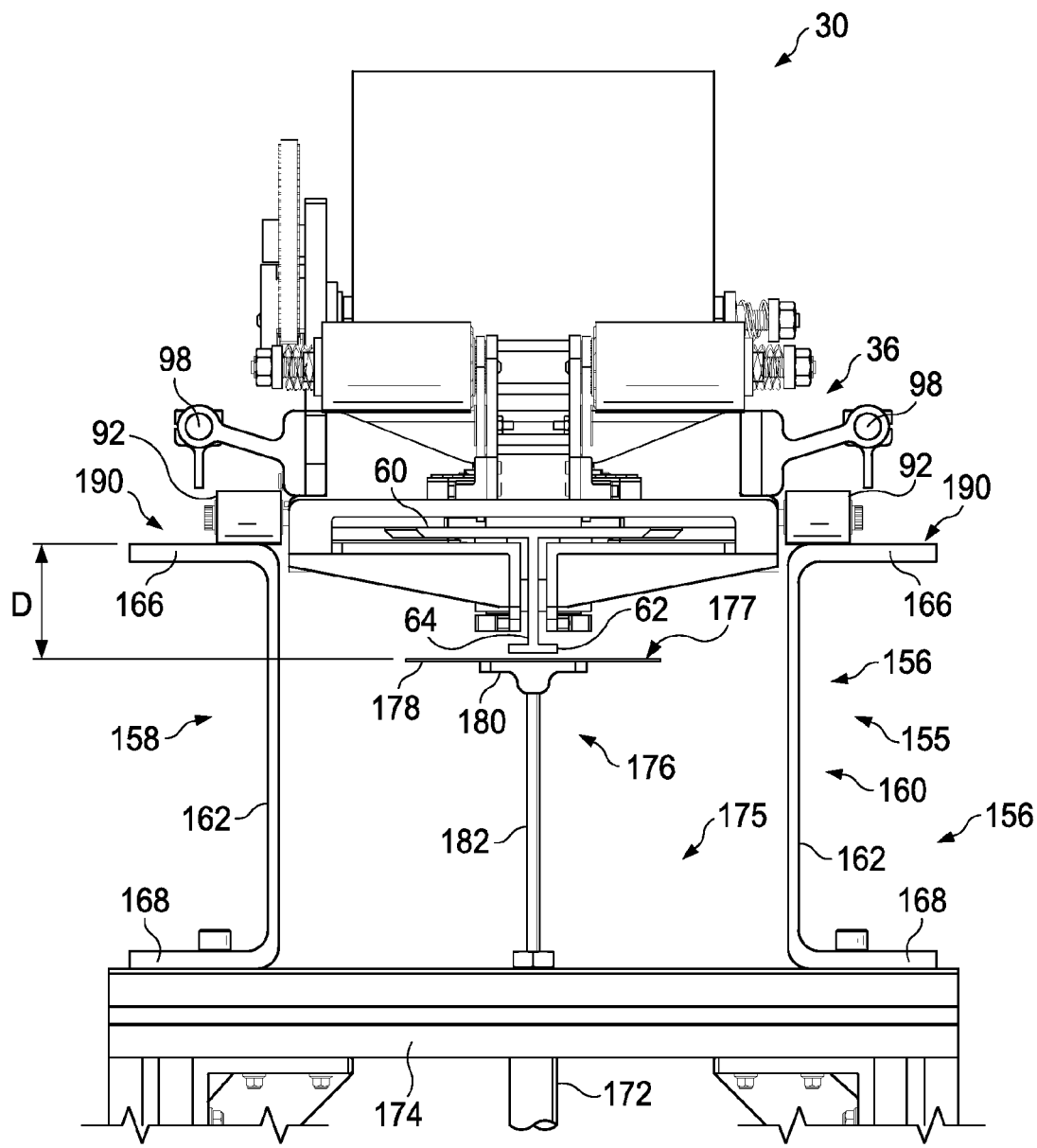
FIG. 28 is an illustration of a cross sectional view taken along the line 28-28 in FIG. 25.
Figure 29:
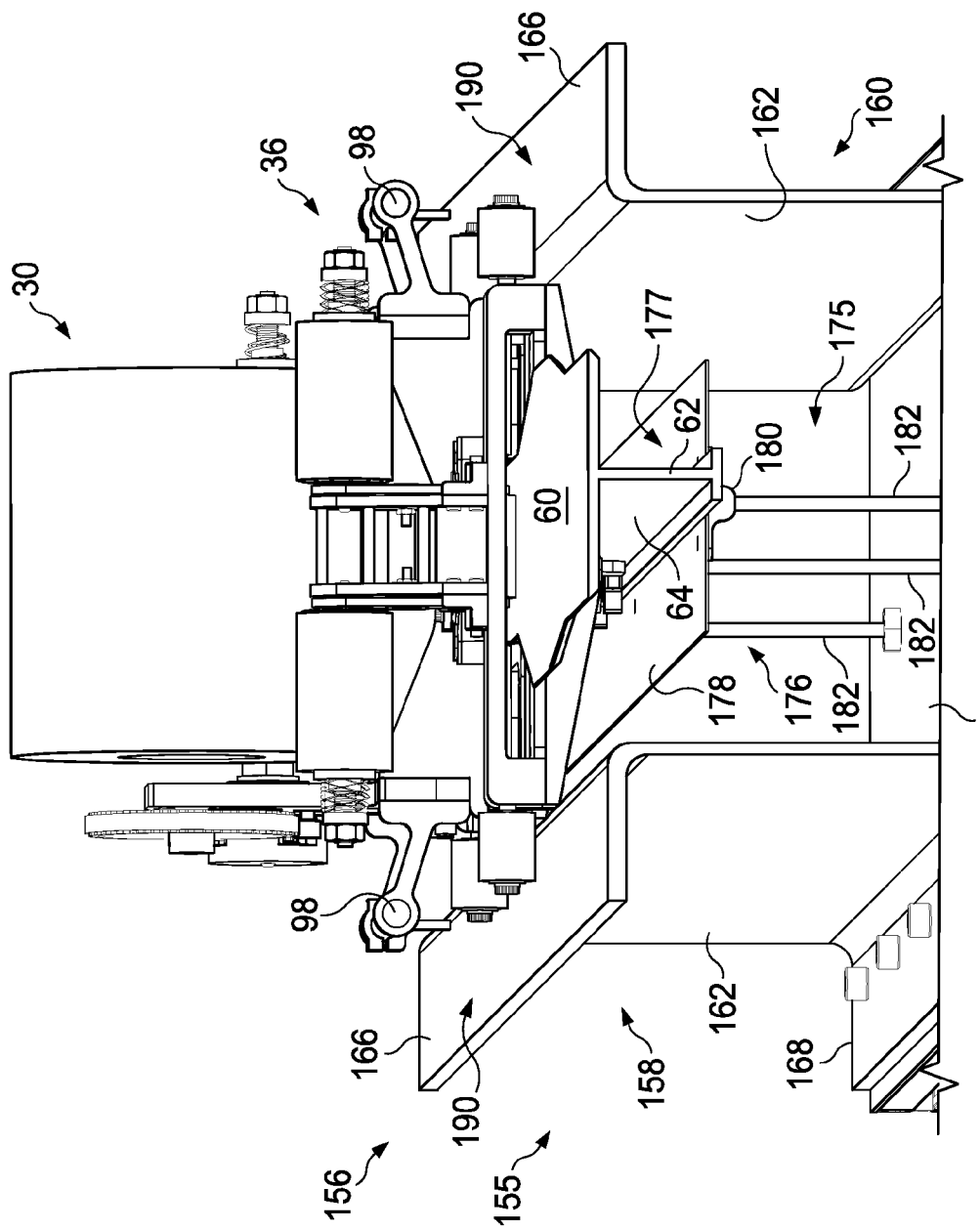
FIG. 29 is an illustration of a perspective, of the cross-sectional view of FIG. 28.
Figure 30:
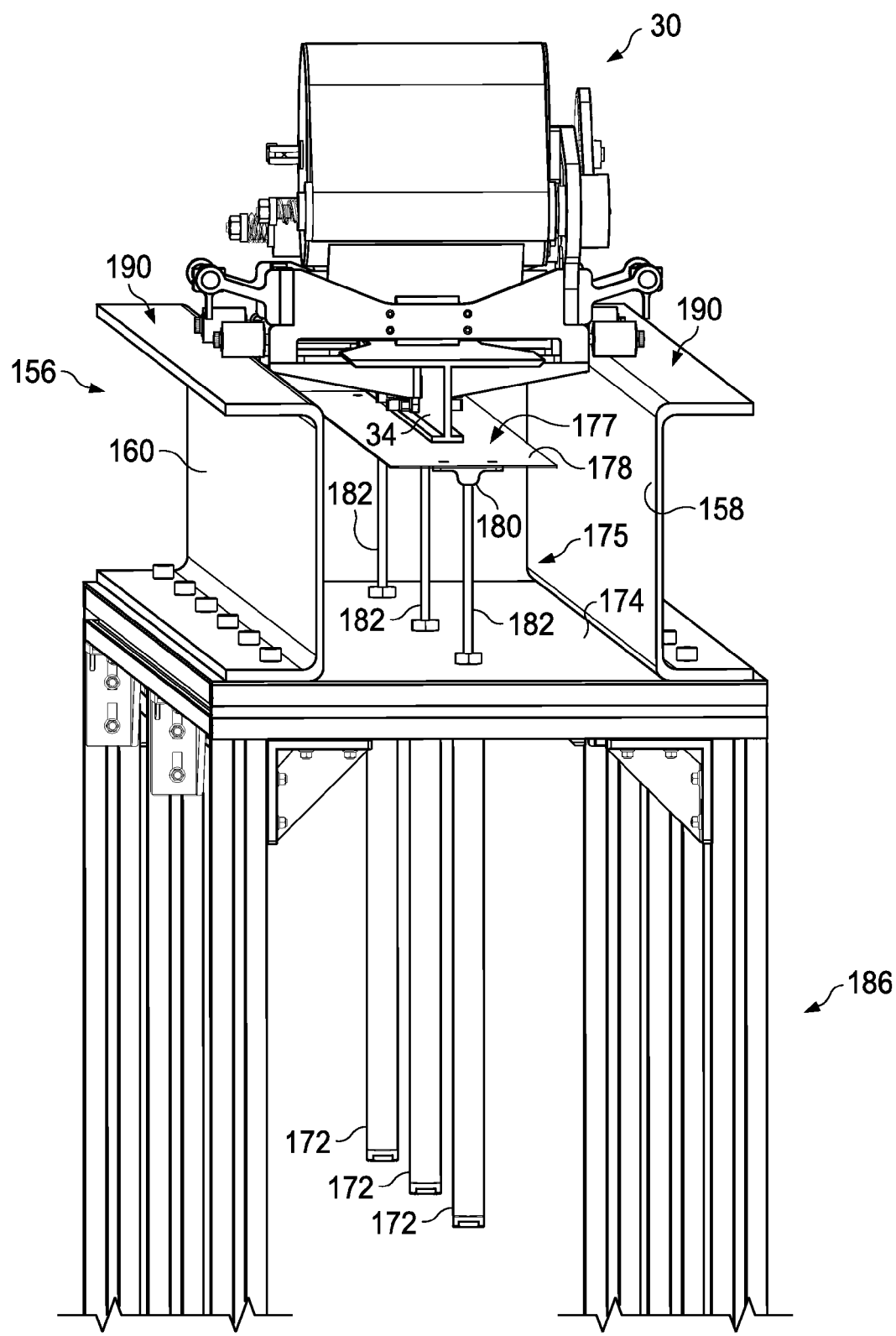
FIG. 30 is an illustration of an upper perspective that are showing the stringer support actuators and actuator rods.
Figure 31:
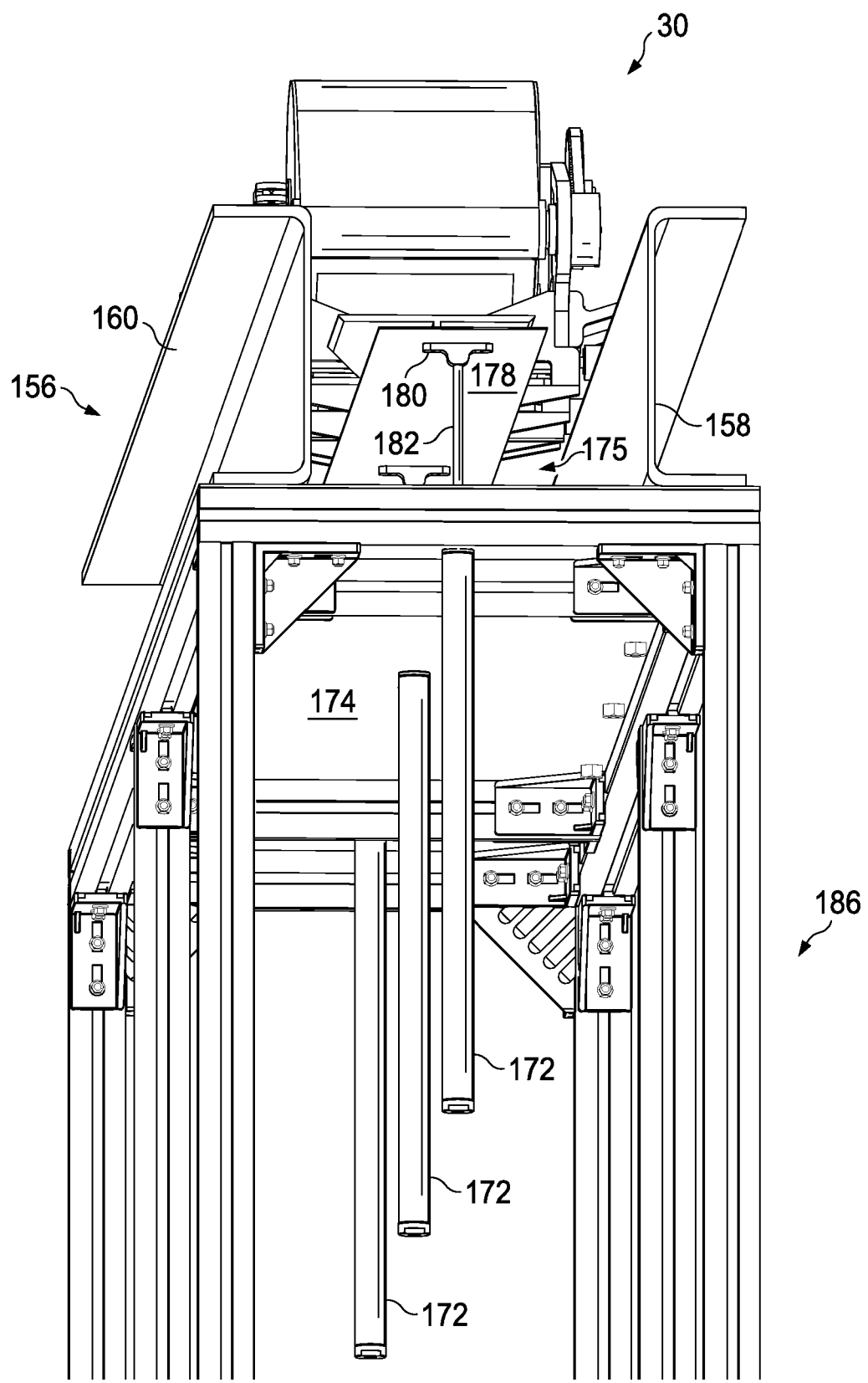
FIG. 31 is illustration similar to FIG. 30, but from a lower perspective.

Attention is now directed to FIGS. 27-31 which illustrate additional details of the holding system 155. Each of the beams 158, 160 is U-shaped in cross section and comprises upper and lower, outwardly turned flanges 166, 168 respectively connected by a web 162 (FIG. 28). Other cross-sectional shapes for the beams 158, 160 are possible. The upper flanges 166 respectively include upper track surfaces 190. The outrigger wheels 92 of the carriage 36 of the material applicator 30 rest on the track surfaces 190 and mount the carriage 36 for rolling movement along the length of the beams 158, 160. The holding fixture 156 further includes an elongate member support assembly 176 mounted on the base 174 of the holding fixture 156 and centrally located between the beams 158, 160, in the transverse direction. The elongate member support assembly 176 extends substantially the entire length of the holding fixture 156 and is adapted to support the elongate member 34 (or similar elongate part) thereon in a desired position, at a desired height. The elongate support assembly 176 comprises an elongate support plate 178 mounted on a series of longitudinally spaced T-blocks 180. The elongate support plate 178 includes an elongate support surface 177 on which the elongate member 34 is supported. The T-blocks 180 are supported on extendable actuator rods 182 which form part of actuators 172 (FIG. 29). The actuators 172 are mounted on, and extend downwardly beneath the base 174 of holding fixture 156 (FIG. 27). The actuators 172 may be pneumatic, hydraulic or electrical, and may be automatically controlled by a programmed computer or a controller. The actuator rods 182 effectively form elongate member supporting struts that are linearly displaceable within the channel 175. In the illustrated embodiment, the elongate member 34 is supported in an inverted position on the elongate member support assembly 176, with the bottom flange 62 of the elongate member 34 resting on the support plate 178.

The spacing "D" between the elongate member support plate 178 and the track surface 190 (FIG. 28) is selected such that the top flange 60 of the elongate member 34 is supported at an elevation that is substantially matched to the compaction roller 46 (see FIG. 13) of the applicator 30. Matching the elevation of the top flange 62 to that of the compaction roller 46 assures that the adhesive film 32 is compacted against the top flange 60 with a desired amount of pressure, in order to smoothly attach the film 32 to the surface of the flange 60. The vertical position of the elongate member 34, and thus of the spacing "D", may be adjusted using the actuators 172 to control the length of extension of the actuator rods 182. It may also be possible to use the actuators 172 to make adjustments in the elongate member support plate 178 in order to accommodate stringers 34 that may have one or more contours along their length.

As previously discussed, the holding fixture 156 cooperates with the carriage 36 to hold and constrain the elongate member 34 in a desired position during the film application process so that the elongate member 34 is substantially weight neutral. This weight neutrality is achieved, in part, by the use of spring-loaded pinch rollers 38 which act as actuators that pinch and hold both the top flange 60 and the web 64 as the bottom flange 62 is being supported on the elongate member support plate 178. The pinching force provided by the pinch rollers 38 assists in constraining the elongate member 34 against vertical or lateral movement as the film material 32 is being applied. Weight neutrality of the elongate member 34 is also achieved by using the actuators 172 to adjust the precise height of the elongate member 34 relative to the material applicator 30.

Figure 32:
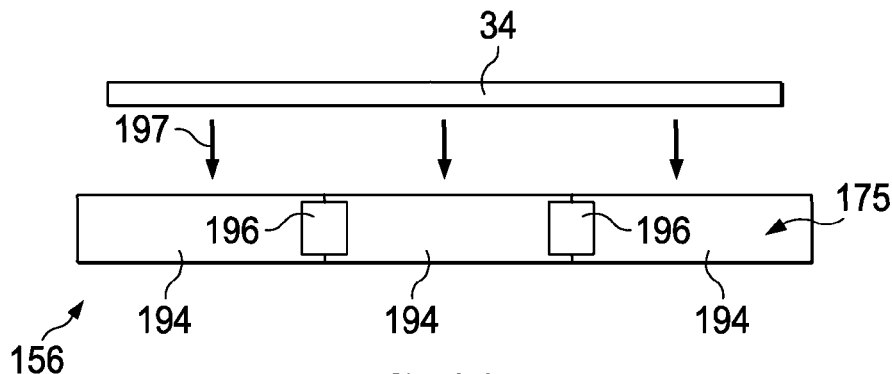
FIG. 32 is an illustration of a diagrammatic side view of a holding system employing modular holding fixtures.

The holding fixture 156 described above may have a modular construction allowing elongate members 34 of various lengths to be held during the film application or other processes. For example, referring to FIG. 32, the holding fixture 156 may comprise a plurality of holding fixture modules 194, each of which is substantially similar to the holding fixture 156 shown in FIGS. 25-31. The holding fixture modules 194 may be joined together using any suitable means, such as, without limitation, splice plates 196. The holding fixture modules 194 may or may not be of equal lengths, and, when assembled, form a channel 175 that is sufficient in length to receive 192 the entire length of the elongate member 34.

Figure 33:
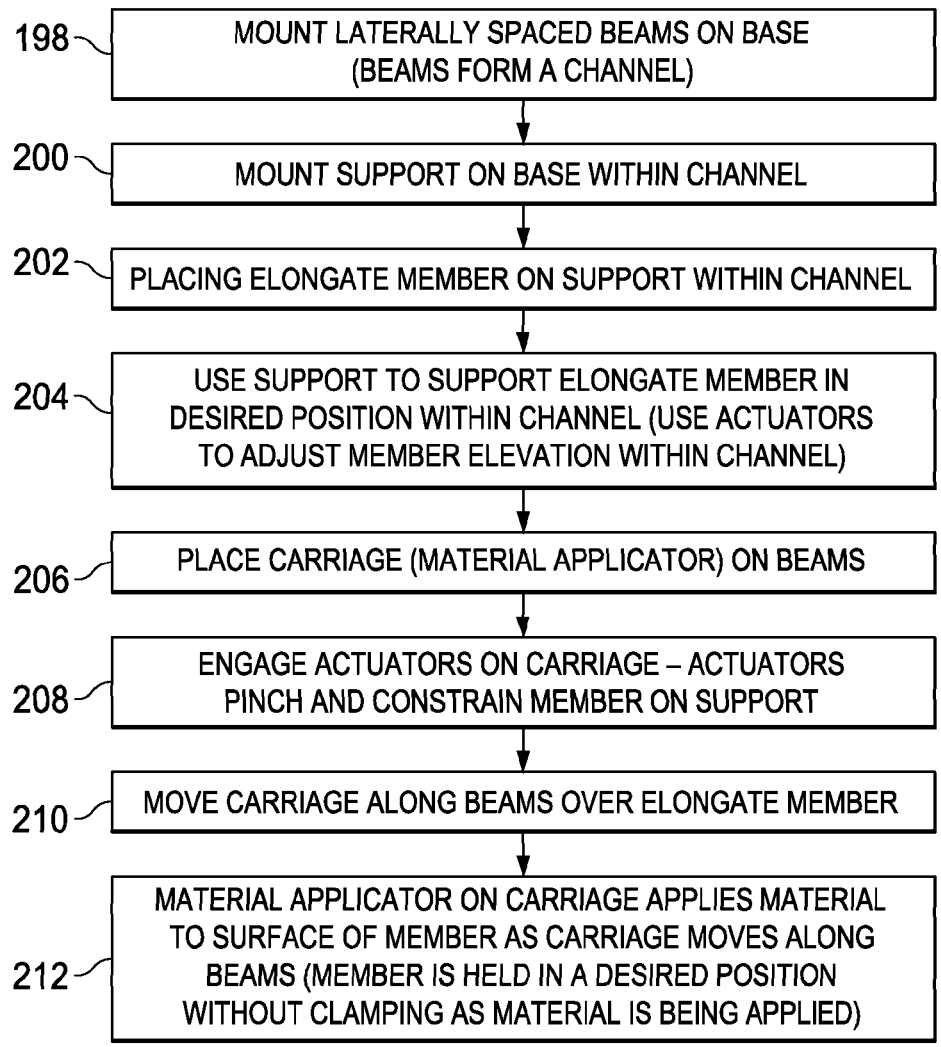
FIG. 33 is an illustration of a flow diagram of a method of holding an elongate member during processing.

Attention is now directed to FIG. 33 which illustrates the overall steps of a method of holding an elongate structural member 34, in a desired position and orientation in a holding system 155, as a process, such as adhesive film application, is being carried out. Beginning at step 198, laterally spaced beams 158, 160 are mounted on a base 174 which form a channel 175 therebetween. At step 280 an elongate member support assembly 176 is mounted within the channel 175 that is adapted to support an elongate member 34. At step 202, the elongate member 34 is placed on the support assembly 176 within the channel 175. At step 204, the support assembly 176 is used to support the elongate member 34 in a desired position and/or orientation within the channel 175. As previously explained, actuators 172 may be used to adjust the elevation of the elongate member within the channel 175. At step 206, a carriage 36, which may include a material applicator, is placed on the beams 158, 160. At step 208, pinch rollers 38 on the carriage 36 are engaged to pinch and constrain the elongate member 34 which has been placed on the support assembly 176. At step 210, the carriage 36 is moved along the beams 158, 160 over the elongate member 34. Depending upon the process being carried out, at step 212, a material applicator 30 on the carriage 36 may be used to apply material 32 to the surface of the elongate member 34 as the carriage 36 moves along the beams 158, 160. As the carriage 36 moves along the beam 158, 160, the elongate member 34 is held in a desired weight-neutral position without the need for clamping, as the material 32 is being applied.

Figure 34:
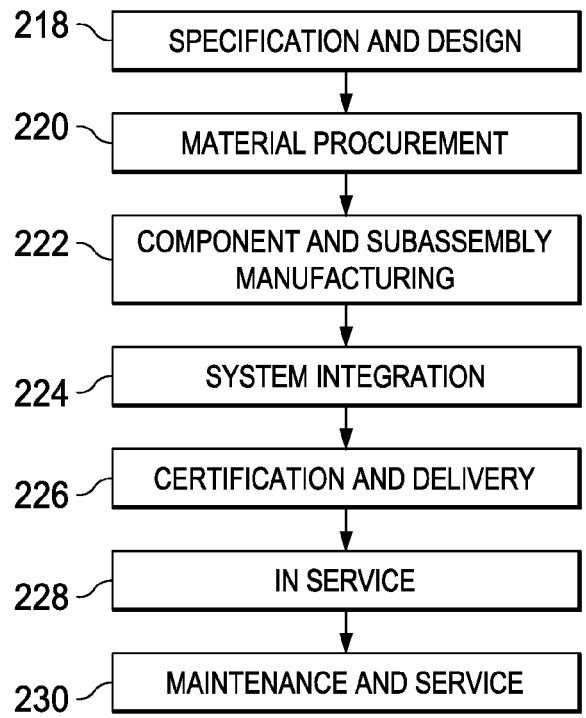
FIG. 34 is an illustration of a flow diagram of aircraft production and service methodology.
Figure 35:
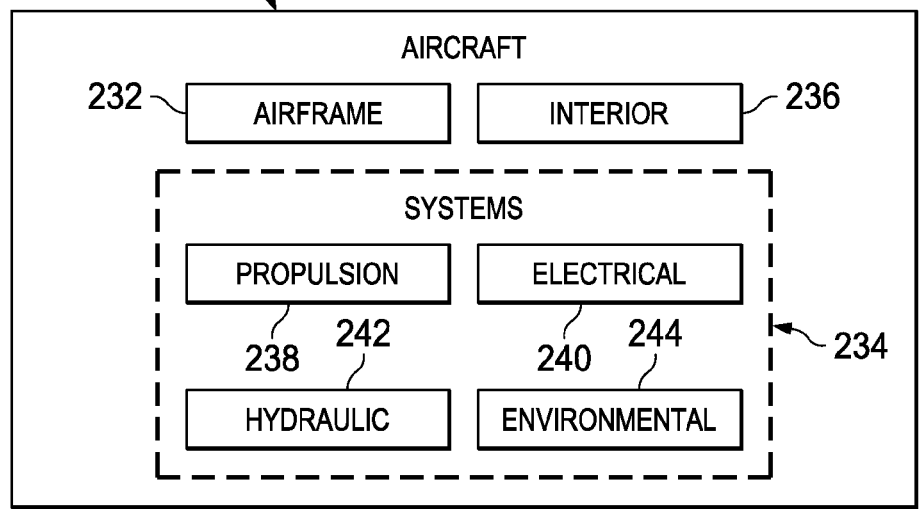
FIG. 35 is illustration of a block diagram of an aircraft.

Embodiments of the disclosure may find use in a variety of potential applications, particularly in the transportation industry, including for example, aerospace, marine, automotive applications and other applications where automated layup equipment may be used. Thus, referring now to FIGS. 34 and 35, embodiments of the disclosure may be used in the context of an aircraft manufacturing and service method 214 as shown in FIG. 34 and an aircraft 216 as shown in FIG. 35. Aircraft applications of the disclosed embodiments may include, for example, without limitation, processing of stringers, spars, doublers, and beams, to name only a few. During pre-production, exemplary method 214 may include specification and design 218 of the aircraft 216 and material procurement 220. During production, component and subassembly manufacturing 222 and system integration 224 of the aircraft 216 takes place. Thereafter, the aircraft 216 may go through certification and delivery 226 in order to be placed in service 228. While in service by a customer, the aircraft 216 is scheduled for routine maintenance and service 230, which may also include modification, reconfiguration, refurbishment, and so on.

Each of the processes of method 214 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 35, the aircraft 216 produced by exemplary method 214 may include an airframe 232 with a plurality of systems 234 and an interior 236. Examples of high-level systems 234 include one or more of a propulsion system 238, an electrical system 240, a hydraulic system 242, and an environmental system 244. Any number of other systems may be included. The disclosed method and apparatus may be employed to place and trim film material on one or more elongate components forming part of the airframe 232 or the interior 236 such as, without limitation, stringers and spars. Although an aerospace example is shown, the principles of the disclosure may be applied to other industries, such as the marine and automotive industries.

Systems and methods embodied herein may be employed during any one or more of the stages of the production and service method 214. For example, components or subassemblies corresponding to production process 222 may be fabricated or manufactured in a manner similar to components or subassemblies produced while the aircraft 216 is in service. Also, one or more apparatus embodiments, method embodiments, or a combination thereof may be utilized during the production stages 222, 224 for example, by substantially expediting assembly of or reducing the cost of an aircraft 216. Similarly, one or more of apparatus embodiments, method embodiments, or a combination thereof may be utilized while the aircraft 216 is in service, for example and without limitation, to maintenance and service 230.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different advantages as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method of holding an elongate member in a weight neutral position as an applicator moves along a length of and applies material to the elongate member, comprising:
   placing an elongate member support within a channel, including mounting the elongate member support on a base between a pair of spaced apart beams attached to the base, and wherein the elongate member support further comprises an extendable actuator rod extending from the base;
   placing the elongate member on the elongate member support;
   using the elongate member support to support the elongate member within the channel beneath the applicator; and using the applicator to constrain the elongate member against movement as the applicator moves along the length of the elongate member.

2. The method of claim 1, wherein using the applicator to constrain the elongate member against movement includes moving actuators into engagement with the elongate member.

3. The method of claim 2, wherein moving the actuators into engagement includes pinching the elongate member between at least one set of rollers.

4. The method of claim 2, further comprising:
using a plurality of actuators to adjust a vertical position of the elongate member support.

5. The method of claim 1 further comprising:
forming flanges on the pair of spaced apart beams; and
supporting the applicator on the flanges a desired distance above the elongate member.

6. The method of claim 1, wherein placing the elongate member support within the channel includes:
mounting a plurality of struts in spaced apart relationship on a base, and
securing an elongate member support surface on the struts.

7. The method of claim 6, further comprising:
adjusting a vertical position of each of the struts on the base using linear actuators.

8. A method of holding an elongate member in a weight neutral position as an applicator moves along a first length of and applies material to the elongate member, comprising:
placing an elongate member support within a channel, the channel defined along a second length between a first beam and a second beam that is about parallel to the first beam, wherein the elongate member support further comprises an extendable actuator rod extending from a base to which the first beam and the second beam are also attached;
placing the elongate member on the elongate member support, wherein the first length is at least as long as the second length;
using the elongate member support to support the elongate member within the channel beneath the applicator;
after using the elongate member support to support the elongate member, placing the applicator on the elongate member opposite the elongate member support such that the elongate member is between the elongate member support and the applicator; and
using the applicator to constrain the elongate member against movement as the applicator moves along the first length of the elongate member.

9. The method of claim 8, wherein placing the elongate member support comprises placing the elongate member support completely inside the channel.

10. The method of claim 9, wherein the first beam and the second beam each have a first height, and wherein the elongate support member has a second height less than the first height.

11. The method of claim 8, wherein the elongate member support further comprises a T-block connected to the extendable actuator rod.

12. The method of claim 11, wherein the elongate member support further comprises an elongate support plate connected to the T-block, the elongate support plate having an elongate support surface supporting the elongate member.

13. The method of claim 8 further comprising:
using the applicator to apply a film material to the elongate member as the applicator moves along moves along the length of the elongate member.

* * * * *